(12) United States Patent
Thiers et al.

(10) Patent No.: US 9,376,823 B1
(45) Date of Patent: *Jun. 28, 2016

(54) FLOOR COVERING

(71) Applicant: Flooring Industries Limited, SARL, Bertrange (LU)

(72) Inventors: Bernard Thiers, Eine (BE); Mark Cappelle, Staden (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,298

(22) Filed: Mar. 8, 2016

Related U.S. Application Data

(60) Continuation of application No. 14/972,313, filed on Dec. 17, 2015, now Pat. No. 9,334,657, which is a continuation of application No. 14/723,848, filed on May 28, 2015, now Pat. No. 9,234,356, which is a (Continued)

(30) Foreign Application Priority Data

Jun. 20, 2000 (BE) .................................. 2000/0397

(51) Int. Cl.
*E04B 2/00* (2006.01)
*E04F 15/02* (2006.01)
*E04F 15/10* (2006.01)

(52) U.S. Cl.
CPC ......... *E04F 15/02038* (2013.01); *E04F 15/102* (2013.01); *E04F 15/107* (2013.01);
(Continued)

(58) Field of Classification Search
CPC ................ E04F 15/02; E04F 15/02038; E04F 2201/0115; E04F 2201/026; E04F 2201/0161; E04F 2201/0153

USPC .......... 52/592.1, 390, 392, 578, 586.1, 589.1, 52/591.1, 590.2, 590.1, 572, 570, 375, 52/588.1; 403/298, 375, 381
See application file for complete search history.

(56) References Cited

U.S. PATENT DOCUMENTS

| 208,036 A | 9/1878 | Robley |
| 213,740 A | 4/1879 | Conner |

(Continued)

FOREIGN PATENT DOCUMENTS

| AT | 000 112 U2 | 2/1995 |
| AU | 13098/83 A | 10/1983 |

(Continued)

OTHER PUBLICATIONS

"Key Contenders in the MDF Stakes", Wood Based Panels International, 3 pages, Sep. 1994.

(Continued)

*Primary Examiner* — Chi Q Nguyen
(74) *Attorney, Agent, or Firm* — Workman Nydegger

(57) ABSTRACT

Hard panels formed from a wood-based material and having a decorative layer for floor coverings are provided, at least on two opposite edges, with coupling devices made in one piece with the panels wherein similar panels may be coupled together to form a floor covering, wherein these coupling devices provide for an interlocking in a direction perpendicular to the plane of coupled panels, as well as in a direction perpendicular to the edges concerned and parallel to the plane of coupled panels. These coupling devices are constituted of a tongue and a groove. The top side of the tongue has a protrusion that cooperates with a meshing recess located in the lower side of the upper lip of the groove of the coupling devices, and a portion extending generally parallel with the plane of the panel to form a contact surface cooperating with the lower side of the upper lip of the groove.

19 Claims, 10 Drawing Sheets

Related U.S. Application Data continuation of application No. 14/560,704, filed on Dec. 4, 2014, now Pat. No. 9,068,356, which is a continuation of application No. 14/320,887, filed on Jul. 1, 2014, now Pat. No. 8,904,729, which is a continuation of application No. 14/093,729, filed on Dec. 2, 2013, now Pat. No. 8,793,958, which is a continuation of application No. 13/893,556, filed on May 14, 2013, now Pat. No. 8,631,625, which is a continuation of application No. 12/821,604, filed on Jun. 23, 2010, now Pat. No. 8,438,814, which is a continuation of application No. 11/979,317, filed on Nov. 1, 2007, now Pat. No. 7,779,597, which is a division of application No. 10/890,456, filed on Jul. 14, 2004, now Pat. No. 7,343,717, which is a division of application No. 09/878,206, filed on Jun. 12, 2001, now Pat. No. 6,772,568.

(52) U.S. Cl.
CPC ........ *E04F 15/02* (2013.01); *E04F 2201/0115* (2013.01); *E04F 2201/0153* (2013.01); *E04F 2201/0161* (2013.01)

(56) References Cited

U.S. PATENT DOCUMENTS

| | | |
|---|---|---|
| 308,313 A | 11/1884 | Gerike |
| 662,458 A | 11/1900 | Nagel |
| 714,987 A | 1/1902 | Wolfe |
| 713,577 A | 11/1902 | Wickham |
| 752,694 A | 2/1904 | Lund |
| 753,791 A | 3/1904 | Fulghum |
| 769,355 A | 9/1904 | Platow |
| 832,003 A | 9/1906 | Torrence |
| 877,639 A | 1/1908 | Galbraith |
| 890,436 A | 6/1908 | Momberg |
| 898,381 A | 9/1908 | Mattison |
| 1,078,776 A | 11/1913 | Dunton |
| 1,097,986 A | 5/1914 | Moritz |
| 1,124,228 A | 1/1915 | Houston |
| 1,137,197 A | 4/1915 | Ellis |
| 1,140,958 A | 5/1915 | Cowan |
| 1,201,285 A | 10/1916 | Gray |
| 1,319,286 A | 10/1919 | Johnson et al. |
| 1,371,856 A | 3/1921 | Cade |
| 1,407,679 A | 2/1922 | Ruthrauff |
| 1,411,415 A | 4/1922 | Cooley |
| 1,436,858 A | 11/1922 | Burhen |
| 1,454,250 A | 5/1923 | Parsons |
| 1,468,288 A | 9/1923 | Een |
| 1,477,813 A | 12/1923 | Daniels et al. |
| 1,510,924 A | 10/1924 | Daniels et al. |
| 1,540,128 A | 6/1925 | Houston |
| 1,575,821 A | 3/1926 | Daniels |
| 1,602,256 A | 10/1926 | Sellin |
| 1,602,267 A | 10/1926 | Karwisch |
| 1,615,096 A | 1/1927 | Meyers |
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |
| 1,660,480 A | 2/1928 | Daniels |
| 1,706,924 A | 3/1929 | Kane |
| 1,714,738 A | 5/1929 | Smith |
| 1,718,702 A | 6/1929 | Pfiester |
| 1,734,826 A | 11/1929 | Pick |
| 1,764,331 A | 6/1930 | Moratz |
| 1,776,188 A | 9/1930 | Langbaum |
| 1,778,069 A | 10/1930 | Fetz |
| 1,787,027 A | 12/1930 | Wasleff |
| 1,801,093 A | 4/1931 | Larkins |
| 1,823,039 A | 9/1931 | Gruner |
| 1,843,024 A | 1/1932 | Fetz |
| 1,854,396 A | 4/1932 | Davis |
| 1,859,667 A | 5/1932 | Gruner |
| 1,864,774 A | 6/1932 | Storm |
| 1,898,364 A | 2/1933 | Gynn |
| 1,906,411 A | 5/1933 | Potvin |
| 1,913,342 A | 6/1933 | Schaffert |
| 1,929,871 A | 10/1933 | Jones |
| 1,940,377 A | 12/1933 | Storm |
| 1,953,306 A | 4/1934 | Moratz |
| 1,978,075 A | 10/1934 | Butterworth |
| 1,986,739 A | 1/1935 | Mitte |
| 1,988,201 A | 1/1935 | Hall |
| 1,991,701 A | 2/1935 | Roman |
| 2,004,193 A | 6/1935 | Cherry |
| 2,015,813 A | 10/1935 | Nielsen |
| 2,027,292 A | 1/1936 | Rockwell |
| 2,044,216 A | 6/1936 | Klages |
| 2,045,067 A | 6/1936 | Bruce |
| 2,049,571 A | 8/1936 | Schuck |
| 2,100,238 A | 11/1937 | Burgess |
| RE20,816 E | 8/1938 | Haase |
| 2,126,956 A | 8/1938 | Gilbert |
| 2,138,085 A | 11/1938 | Birtles |
| 2,141,708 A | 12/1938 | Elmendorf, III |
| 2,142,305 A | 1/1939 | Davis |
| 2,199,938 A | 5/1940 | Loote |
| 2,222,137 A | 11/1940 | Bruce |
| 2,226,540 A | 12/1940 | Boettcher |
| 2,245,497 A | 6/1941 | Potchen |
| 2,253,943 A | 8/1941 | Rice |
| 2,261,897 A | 11/1941 | Adams |
| 2,263,930 A | 11/1941 | Pasquier |
| 2,266,464 A | 12/1941 | Kraft |
| 2,276,071 A | 3/1942 | Scull |
| 2,280,071 A | 4/1942 | Hamilton |
| 2,282,559 A | 5/1942 | Byers |
| 2,324,628 A | 7/1943 | Kahr |
| 2,398,632 A | 4/1946 | Frost et al. |
| 2,430,200 A | 11/1947 | Wilson |
| 2,441,364 A | 5/1948 | Maynard |
| 2,491,498 A | 12/1949 | Kahr |
| 2,644,552 A | 7/1953 | Macdonald |
| 2,729,584 A | 1/1956 | Foster |
| 2,740,167 A | 4/1956 | Rowley |
| 2,780,253 A | 2/1957 | Joa |
| 2,805,852 A | 9/1957 | Malm |
| 2,808,624 A | 10/1957 | Sullivan |
| 2,823,433 A | 2/1958 | Kendall |
| 2,831,223 A | 4/1958 | De Shazor, Jr |
| 2,839,790 A | 6/1958 | Collings |
| 2,863,185 A | 12/1958 | Riedi |
| 2,865,058 A | 12/1958 | Andersson et al. |
| 2,875,117 A | 2/1959 | Potchen et al. |
| 2,878,530 A | 3/1959 | Lindstrom |
| 2,894,292 A | 7/1959 | Gramelspacher |
| 2,914,815 A | 12/1959 | Alexander |
| 2,947,040 A | 8/1960 | Schultz |
| 2,952,341 A | 9/1960 | Weiler |
| 2,974,692 A | 3/1961 | Bolenbach |
| 3,045,294 A | 7/1962 | Livezey, Jr |
| 3,090,082 A | 5/1963 | Baumann |
| 3,100,556 A | 8/1963 | De Ridder |
| 3,125,138 A | 3/1964 | Bolenbach |
| 3,128,851 A | 4/1964 | Deridder et al. |
| 3,141,392 A | 7/1964 | Schneider et al. |
| 3,162,906 A | 12/1964 | Dudley |
| 3,182,769 A | 5/1965 | Ridder |
| 3,199,258 A | 8/1965 | Jentoft et al. |
| 3,200,553 A | 8/1965 | Frashour et al. |
| 3,203,149 A | 8/1965 | Soddy |
| 3,204,380 A | 9/1965 | Smith et al. |
| 3,253,377 A | 5/1966 | Schakel |
| 3,267,630 A | 8/1966 | Omholt |
| 3,282,010 A | 11/1966 | King, Jr. |
| 3,301,147 A | 1/1967 | Clayton et al. |
| 3,310,919 A | 3/1967 | Bue et al. |
| 3,313,072 A | 4/1967 | Cue |
| 3,339,329 A | 9/1967 | Berg |
| 3,347,048 A | 10/1967 | Brown et al. |
| 3,363,381 A | 1/1968 | Forrest |

(56) References Cited

U.S. PATENT DOCUMENTS

| | | |
|---|---|---|
| 3,363,382 A | 1/1968 | Forrest |
| 3,373,071 A | 3/1968 | Fuerst |
| 3,377,931 A | 4/1968 | Hilton |
| 3,385,182 A | 5/1968 | Harvey |
| 3,387,422 A | 6/1968 | Wanzer |
| 3,397,496 A | 8/1968 | Sohns |
| 3,444,660 A | 5/1969 | Feichter et al. |
| 3,449,879 A | 6/1969 | Bloom |
| 3,460,304 A | 8/1969 | Braeuninger et al. |
| 3,474,584 A | 10/1969 | Lynch |
| 3,479,784 A | 11/1969 | Massagli |
| 3,481,810 A | 12/1969 | Waite |
| 3,488,828 A | 1/1970 | Gallagher |
| 3,526,420 A | 9/1970 | Brancaleone |
| 3,535,844 A | 10/1970 | Glaros |
| 3,538,665 A | 11/1970 | Gohner |
| 3,538,819 A | 11/1970 | Gould, Jr |
| 3,548,559 A | 12/1970 | Levine |
| 3,553,919 A | 1/1971 | Omholt |
| 3,555,761 A | 1/1971 | Rosebrough |
| 3,555,762 A | 1/1971 | Costanzo, Jr |
| 3,572,224 A | 3/1971 | Perry |
| 3,579,941 A | 5/1971 | Tibbals |
| 3,619,964 A | 11/1971 | Passaro et al. |
| 3,627,362 A | 12/1971 | Brenneman |
| 3,640,191 A | 2/1972 | Hendrich |
| 3,657,852 A | 4/1972 | Worthington et al. |
| 3,665,666 A | 5/1972 | Delcroix |
| 3,667,153 A | 6/1972 | Christiansen |
| 3,687,773 A | 8/1972 | Wangborg |
| 3,694,983 A | 10/1972 | Couquet |
| 3,696,575 A | 10/1972 | Armstrong |
| 3,714,747 A | 2/1973 | Curran |
| 3,720,027 A | 3/1973 | Christensen |
| 3,731,445 A | 5/1973 | Hoffmann et al. |
| 3,740,914 A | 6/1973 | Arnaiz |
| 3,742,672 A | 7/1973 | Schaeufele |
| 3,745,726 A | 7/1973 | Thom |
| 3,758,650 A | 9/1973 | Hurst |
| 3,759,007 A | 9/1973 | Thiele |
| 3,760,544 A | 9/1973 | Hawes et al. |
| 3,760,548 A | 9/1973 | Sauer et al. |
| 3,761,338 A | 9/1973 | Ungar et al. |
| 3,768,846 A | 10/1973 | Hensley et al. |
| 3,778,958 A | 12/1973 | Fowler |
| 3,780,469 A | 12/1973 | Hancovsky |
| 3,786,608 A | 1/1974 | Boettcher |
| 3,798,111 A | 3/1974 | Lane et al. |
| 3,807,113 A | 4/1974 | Turner |
| 3,859,000 A | 1/1975 | Webster |
| 3,884,328 A | 5/1975 | Williams |
| 3,902,293 A | 9/1975 | Witt et al. |
| 3,908,053 A | 9/1975 | Hettich |
| 3,921,312 A | 11/1975 | Fuller |
| 3,924,496 A | 12/1975 | DerMarderosian et al. |
| 3,936,551 A | 2/1976 | Elmendorf et al. |
| 3,987,599 A | 10/1976 | Hines |
| 3,988,187 A | 10/1976 | Witt et al. |
| 4,021,087 A | 5/1977 | Ferguson |
| 4,037,377 A | 7/1977 | Howell et al. |
| 4,059,933 A | 11/1977 | Funk et al. |
| 4,065,902 A | 1/1978 | Lindal |
| 4,067,155 A | 1/1978 | Ruff et al. |
| 4,074,496 A | 2/1978 | Fischer |
| 4,090,338 A | 5/1978 | Bourgade |
| 4,095,913 A | 6/1978 | Pettersson et al. |
| 4,099,358 A | 7/1978 | Compaan |
| 4,100,710 A | 7/1978 | Kowallik |
| 4,144,689 A | 3/1979 | Bains |
| 4,156,048 A | 5/1979 | Davis |
| 4,164,832 A | 8/1979 | Van Zandt |
| 4,165,305 A | 8/1979 | Sundie et al. |
| 4,169,688 A | 10/1979 | Toshio |
| 4,182,072 A | 1/1980 | Much |
| 4,186,539 A | 2/1980 | Harmon et al. |
| 4,242,390 A | 12/1980 | Nemeth |
| 4,299,070 A | 11/1981 | Oltmanns et al. |
| 4,316,351 A | 2/1982 | Ting |
| 4,372,899 A | 2/1983 | Wiemann et al. |
| 4,376,593 A | 3/1983 | Schaefer |
| 4,390,580 A | 6/1983 | Donovan et al. |
| 4,426,820 A | 1/1984 | Terbrack et al. |
| 4,449,346 A | 5/1984 | Tremblay |
| 4,455,803 A | 6/1984 | Kornberger |
| 4,461,131 A | 7/1984 | Pressell |
| 4,471,012 A | 9/1984 | Maxwell |
| 4,489,115 A | 12/1984 | Layman et al. |
| 4,501,102 A | 2/1985 | Knowles |
| 4,503,115 A | 3/1985 | Hemels et al. |
| 4,517,147 A | 5/1985 | Taylor et al. |
| 4,538,392 A | 9/1985 | Hamar et al. |
| 4,561,233 A | 12/1985 | Harter et al. |
| 4,599,124 A | 7/1986 | Kelly et al. |
| 4,599,841 A | 7/1986 | Haid |
| 4,599,842 A | 7/1986 | Counihan |
| 4,612,745 A | 9/1986 | Hovde |
| 4,640,437 A | 2/1987 | Weingartner |
| 4,641,469 A | 2/1987 | Wood |
| 4,643,237 A | 2/1987 | Rosa |
| 4,646,494 A | 3/1987 | Saarinen et al. |
| 4,653,242 A | 3/1987 | Ezard |
| 4,703,597 A | 11/1987 | Eggemar |
| 4,715,162 A | 12/1987 | Brightwell |
| 4,724,187 A | 2/1988 | Ungar et al. |
| 4,738,071 A | 4/1988 | Ezard |
| 4,757,658 A | 7/1988 | Kaempen |
| 4,769,963 A | 9/1988 | Meyerson |
| 4,806,435 A | 2/1989 | Athey |
| 4,819,932 A | 4/1989 | Trotter, Jr. |
| 4,831,806 A | 5/1989 | Niese et al. |
| 4,845,907 A | 7/1989 | Meek |
| 4,905,442 A | 3/1990 | Daniels |
| 4,906,484 A | 3/1990 | Lambuth et al. |
| 4,952,775 A | 8/1990 | Yokoyama et al. |
| 4,953,335 A | 9/1990 | Kawaguchi et al. |
| 4,988,131 A | 1/1991 | Wilson et al. |
| 4,998,395 A | 3/1991 | Bezner |
| 4,998,396 A | 3/1991 | Palmersten |
| 5,029,425 A | 7/1991 | Bogataj |
| 5,050,362 A | 9/1991 | Tal et al. |
| 5,074,089 A | 12/1991 | Kemmer et al. |
| 5,086,599 A | 2/1992 | Meyerson |
| 5,092,095 A | 3/1992 | Zadok et al. |
| 5,109,898 A | 5/1992 | Schacht |
| 5,113,632 A | 5/1992 | Hanson |
| 5,117,603 A | 6/1992 | Weintraub |
| 5,138,812 A | 8/1992 | Palmersten |
| 5,148,850 A | 9/1992 | Urbanick |
| 5,155,952 A | 10/1992 | Herwegh et al. |
| 5,157,890 A | 10/1992 | Jines |
| 5,165,816 A | 11/1992 | Parasin |
| 5,179,812 A | 1/1993 | Hill |
| 5,182,892 A | 2/1993 | Chase |
| 5,216,861 A | 6/1993 | Meyerson |
| 5,244,303 A | 9/1993 | Hair |
| 5,247,773 A | 9/1993 | Weir |
| 5,253,464 A | 10/1993 | Nilsen |
| 5,259,162 A | 11/1993 | Nicholas |
| 5,266,384 A | 11/1993 | O'Dell et al. |
| 5,271,564 A | 12/1993 | Smith |
| 5,274,979 A | 1/1994 | Tsai |
| 5,283,102 A | 2/1994 | Sweet et al. |
| 5,295,341 A | 3/1994 | Kajiwara |
| 5,343,665 A | 9/1994 | Palmersten |
| 5,344,700 A | 9/1994 | McGath et al. |
| 5,348,778 A | 9/1994 | Knipp et al. |
| 5,349,796 A | 9/1994 | Meyerson |
| 5,365,713 A | 11/1994 | Nicholas et al. |
| 5,390,457 A | 2/1995 | Sjolander |
| 5,413,840 A | 5/1995 | Mizuno |
| 5,424,118 A | 6/1995 | McLaughlin |
| 5,433,806 A | 7/1995 | Pasquali et al. |
| 5,437,934 A | 8/1995 | Witt et al. |
| 5,474,831 A | 12/1995 | Nystrom |

(56) References Cited

U.S. PATENT DOCUMENTS

| | | |
|---|---|---|
| 5,475,960 A | 12/1995 | Lindal |
| 5,497,589 A | 3/1996 | Porter |
| 5,502,939 A | 4/1996 | Zadok et al. |
| 5,526,857 A | 6/1996 | Forman |
| 5,527,128 A | 6/1996 | Rope et al. |
| 5,540,025 A | 7/1996 | Takehara et al. |
| 5,555,980 A | 9/1996 | Johnston et al. |
| 5,566,519 A | 10/1996 | Almaraz-Miera |
| 5,570,554 A | 11/1996 | Searer |
| 5,618,602 A | 4/1997 | Nelson |
| 5,623,799 A | 4/1997 | Kowalski et al. |
| 5,630,304 A | 5/1997 | Austin |
| 5,647,181 A | 7/1997 | Hunts |
| 5,671,575 A | 9/1997 | Wu |
| 5,706,621 A | 1/1998 | Pervan |
| 5,736,227 A | 4/1998 | Sweet et al. |
| 5,755,068 A | 5/1998 | Ormiston |
| 5,768,850 A | 6/1998 | Chen |
| 5,791,114 A | 8/1998 | Mandel |
| 5,797,237 A | 8/1998 | Finkell, Jr. |
| 5,827,592 A | 10/1998 | Van Gulik et al. |
| 5,860,267 A | 1/1999 | Pervan |
| D406,360 S | 3/1999 | Finkell, Jr. |
| 5,894,701 A | 4/1999 | Delorme |
| 5,904,019 A | 5/1999 | Kooij et al. |
| 5,907,934 A | 6/1999 | Austin |
| 5,930,947 A | 8/1999 | Eckhoff |
| 5,935,668 A | 8/1999 | Smith |
| 5,937,612 A | 8/1999 | Winer et al. |
| 5,941,047 A | 8/1999 | Johansson |
| 5,950,389 A | 9/1999 | Porter |
| 5,968,625 A | 10/1999 | Hudson |
| 5,971,655 A | 10/1999 | Shirakawa |
| 5,987,839 A | 11/1999 | Hamar et al. |
| 5,987,845 A | 11/1999 | Laronde |
| 5,996,301 A | 12/1999 | Conterno |
| 6,006,486 A | 12/1999 | Moriau et al. |
| 6,021,615 A | 2/2000 | Brown |
| 6,023,907 A | 2/2000 | Pervan |
| 6,029,416 A | 2/2000 | Andersson |
| 6,094,882 A | 8/2000 | Pervan |
| 6,101,778 A | 8/2000 | Martensson |
| 6,119,423 A | 9/2000 | Costantino |
| 6,134,854 A | 10/2000 | Stanchfield |
| 6,148,884 A | 11/2000 | Bolyard et al. |
| 6,156,402 A | 12/2000 | Smith |
| 6,158,915 A | 12/2000 | Kise |
| 6,182,410 B1 | 2/2001 | Pervan |
| 6,182,413 B1 | 2/2001 | Magnusson |
| 6,189,283 B1 | 2/2001 | Bentley et al. |
| 6,205,639 B1 | 3/2001 | Pervan |
| 6,209,278 B1 | 4/2001 | Tychsen |
| 6,216,409 B1 | 4/2001 | Roy et al. |
| 6,247,285 B1 | 6/2001 | Moebus |
| 6,271,156 B1 | 8/2001 | Gleason et al. |
| 6,314,701 B1 | 11/2001 | Meyerson |
| 6,324,803 B1 | 12/2001 | Pervan |
| 6,324,809 B1 | 12/2001 | Nelson |
| 6,332,733 B1 | 12/2001 | Hamberger et al. |
| 6,345,481 B1 | 2/2002 | Nelson |
| 6,363,677 B1 | 4/2002 | Chen et al. |
| 6,385,936 B1 | 5/2002 | Schneider |
| 6,397,547 B1 | 6/2002 | Martensson |
| 6,418,683 B1 | 7/2002 | Martensson et al. |
| 6,421,970 B1 | 7/2002 | Martensson et al. |
| 6,423,257 B1 | 7/2002 | Stobart et al. |
| 6,438,919 B1 | 8/2002 | Knauseder |
| 6,446,405 B1 | 9/2002 | Peravn |
| 6,497,079 B1 | 12/2002 | Pletzer et al. |
| 6,505,452 B1 | 1/2003 | Hannig et al. |
| 6,516,579 B1 | 2/2003 | Pervan |
| 6,536,178 B1 | 3/2003 | Palsson et al. |
| 6,591,568 B1 | 7/2003 | Palsson |
| 6,601,359 B2 | 8/2003 | Olofsson |
| 6,647,690 B1 | 11/2003 | Martensson |
| 6,682,254 B1 | 1/2004 | Olofsson et al. |
| 6,685,391 B1 | 2/2004 | Gideon |
| 6,711,869 B2 | 3/2004 | Tychsen |
| 6,729,091 B1 | 5/2004 | Martensson |
| 6,763,643 B1 | 7/2004 | Martensson |
| 6,766,622 B1 | 7/2004 | Thiers |
| 6,769,835 B2 | 8/2004 | Stridsman |
| 6,772,568 B2 | 8/2004 | Thiers et al. |
| 6,804,926 B1 | 10/2004 | Eisermann |
| 6,823,638 B2 | 11/2004 | Stanchfield |
| 7,343,717 B2 | 3/2008 | Thiers et al. |
| 7,380,383 B2 | 6/2008 | Olofsson et al. |
| 7,603,826 B1 | 10/2009 | Moebus |
| 7,658,048 B2 | 2/2010 | Moriau et al. |
| 7,779,597 B2 | 8/2010 | Thiers et al. |
| 8,006,458 B1 | 8/2011 | Olofsson et al. |
| 8,215,076 B2 | 7/2012 | Pervan et al. |
| 8,429,869 B2 | 4/2013 | Pervan |
| 8,438,814 B2 | 5/2013 | Thiers et al. |
| 8,627,631 B2 | 1/2014 | Thiers et al. |
| 8,631,625 B2 | 1/2014 | Thiers et al. |
| 8,793,958 B2 | 8/2014 | Theirs et al. |
| 8,904,729 B2 | 12/2014 | Thiers et al. |
| 9,068,356 B2 | 6/2015 | Thiers et al. |
| 9,234,356 B2 * | 1/2016 | Thiers ............ E04F 15/02 |
| 9,334,657 B2 * | 5/2016 | Thiers ............ E04F 15/02 |
| 2001/0029720 A1 | 10/2001 | Pervan |
| 2001/0034992 A1 | 11/2001 | Pletzer et al. |
| 2002/0020127 A1 | 2/2002 | Thiers et al. |
| 2002/0083673 A1 | 7/2002 | Kettler et al. |
| 2002/0100242 A1 | 8/2002 | Olofsson |
| 2002/0108343 A1 | 8/2002 | Knauseder |
| 2002/0148551 A1 | 10/2002 | Knauseder |
| 2002/0170258 A1 | 11/2002 | Schwitte et al. |
| 2002/0178681 A1 | 12/2002 | Zancai et al. |
| 2004/0035077 A1 | 2/2004 | Martensson et al. |
| 2004/0139678 A1 | 7/2004 | Pervan |
| 2005/0005559 A1 | 1/2005 | Ralf |
| 2005/0028474 A1 | 2/2005 | Kim |
| 2013/0104487 A1 | 5/2013 | Moriau et al. |
| 2013/0247501 A1 | 9/2013 | Thiers et al. |

FOREIGN PATENT DOCUMENTS

| | | |
|---|---|---|
| AU | 752409 B2 | 9/2002 |
| BE | 417 526 A | 9/1936 |
| BE | 556 860 A | 5/1957 |
| BE | 557 844 A | 6/1957 |
| BE | 765 817 A2 | 9/1971 |
| CA | 991 373 A1 | 6/1976 |
| CA | 1049736 A1 | 3/1979 |
| CA | 1 169 106 A1 | 6/1984 |
| CA | 2 162 836 A1 | 5/1997 |
| CA | 2 226 286 A1 | 12/1997 |
| CA | 2 252 791 A1 | 5/1999 |
| CA | 2 289 309 A1 | 7/2000 |
| CH | 200 949 A | 11/1938 |
| CH | 211 877 A | 10/1940 |
| CH | 562 377 A5 | 5/1975 |
| CN | 1054215 A | 9/1991 |
| CN | 2091909 U | 1/1992 |
| CN | 1115351 A | 1/1996 |
| CN | 1124941 A | 6/1996 |
| CN | 2242278 Y | 12/1996 |
| DE | 209979 C | 11/1906 |
| DE | 417526 C | 8/1925 |
| DE | 1 212 275 B | 3/1966 |
| DE | 1 985 418 U | 5/1968 |
| DE | 1 534 802 A1 | 4/1970 |
| DE | 1 102 476 U | 1/1971 |
| DE | 1 658 875 B1 | 9/1971 |
| DE | 2 007 129 A1 | 9/1971 |
| DE | 1 534 278 A1 | 11/1971 |
| DE | 2 139 283 A1 | 2/1972 |
| DE | 2 101 782 A1 | 7/1972 |
| DE | 2 102 537 A1 | 8/1972 |
| DE | 2 145 024 A1 | 3/1973 |
| DE | 2 205 232 A1 | 8/1973 |
| DE | 2 238 660 A1 | 2/1974 |

(56) References Cited

FOREIGN PATENT DOCUMENTS

| | | |
|---|---|---|
| DE | 2 251 762 A1 | 5/1974 |
| DE | 2 252 643 A1 | 5/1974 |
| DE | 7 402 354 U | 5/1974 |
| DE | 2 502 992 A1 | 7/1976 |
| DE | 2 616 077 A1 | 10/1977 |
| DE | 78 36 825 U1 | 6/1980 |
| DE | 29 17 025 A1 | 11/1980 |
| DE | 29 16 482 A1 | 12/1980 |
| DE | 29 27 425 A1 | 1/1981 |
| DE | 29 40 945 A1 | 4/1981 |
| DE | 79 11 924 U1 | 6/1981 |
| DE | 79 28 703 U1 | 7/1981 |
| DE | 41 05 207 A1 | 8/1981 |
| DE | 30 41 781 A1 | 6/1982 |
| DE | 31 04 519 A1 | 9/1982 |
| DE | 31 17 605 A1 | 11/1982 |
| DE | 32 14 207 A1 | 11/1982 |
| DE | 32 46 376 A1 | 6/1984 |
| DE | 33 04 992 A1 | 8/1984 |
| DE | 33 06 609 A1 | 9/1984 |
| DE | 33 19 235 A1 | 11/1984 |
| DE | 33 43 601 A1 | 6/1985 |
| DE | 34 12 882 A1 | 10/1985 |
| DE | 86 04 004 U1 | 4/1986 |
| DE | 35 12 204 A1 | 10/1986 |
| DE | 33 43 601 C2 | 2/1987 |
| DE | 35 38 538 A1 | 5/1987 |
| DE | 35 44 845 A1 | 6/1987 |
| DE | 36 31 390 A1 | 12/1987 |
| DE | 37 41 041 A1 | 9/1988 |
| DE | 40 02 547 A1 | 8/1991 |
| DE | 39 32 980 A1 | 11/1991 |
| DE | 41 30 115 A1 | 3/1993 |
| DE | 93 00 306 U1 | 3/1993 |
| DE | 41 34 452 A1 | 4/1993 |
| DE | 42 15 273 A1 | 11/1993 |
| DE | 42 42 530 A1 | 6/1994 |
| DE | 43 13 037 C1 | 8/1994 |
| DE | 93 17 191 U1 | 3/1995 |
| DE | 44 02 352 A1 | 8/1995 |
| DE | 295 20 966 U1 | 8/1996 |
| DE | 197 09 641 A1 | 9/1998 |
| DE | 299 11 462 U1 | 11/1999 |
| DE | 299 22 649 U1 | 3/2000 |
| DE | 200 02 413 U1 | 4/2000 |
| DE | 200 00 484 U1 | 5/2000 |
| DE | 200 01 225 U1 | 7/2000 |
| DE | 296 23 914 U1 | 7/2000 |
| DE | 200 05 877 U1 | 10/2000 |
| DE | 199 25 248 A1 | 12/2000 |
| DE | 200 18 760 U1 | 12/2000 |
| DE | 200 17 461 U1 | 2/2001 |
| DE | 100 08 108 C1 | 5/2001 |
| DK | 3726-84 A | 8/1984 |
| EP | 0 085 196 A1 | 8/1983 |
| EP | 0 196 672 A2 | 10/1986 |
| EP | 0 220 389 A2 | 5/1987 |
| EP | 0 248 127 A1 | 12/1987 |
| EP | 0 279 278 A2 | 8/1988 |
| EP | 0 487 925 A1 | 6/1992 |
| EP | 0 562 402 A1 | 9/1993 |
| EP | 0 623 724 A1 | 11/1994 |
| EP | 0 652 332 A1 | 5/1995 |
| EP | 0 652 340 A1 | 5/1995 |
| EP | 0 690 185 A1 | 1/1996 |
| EP | 0 698 162 A1 | 2/1996 |
| EP | 0 715 037 A1 | 6/1996 |
| EP | 0 855 482 A2 | 7/1998 |
| EP | 0 877 130 A2 | 11/1998 |
| EP | 0 903 451 A2 | 3/1999 |
| EP | 0 969 163 A2 | 1/2000 |
| EP | 0 969 164 A2 | 1/2000 |
| EP | 0 974 713 A1 | 1/2000 |
| EP | 1 024 234 A2 | 8/2000 |
| EP | 0 813 641 B1 | 7/2001 |
| EP | 1 203 854 A2 | 5/2002 |
| EP | 0 958 441 B1 | 7/2003 |
| EP | 0 843 763 B2 | 11/2006 |
| FR | 1 215 852 A | 4/1960 |
| FR | 1 293 043 A | 5/1962 |
| FR | 2 209 024 A1 | 6/1974 |
| FR | 2 278 876 A1 | 2/1976 |
| FR | 2 445 874 A1 | 8/1980 |
| FR | 2 568 295 A1 | 1/1986 |
| FR | 2 630 149 A1 | 10/1989 |
| FR | 2 637 932 A1 | 4/1990 |
| FR | 2 675 174 A1 | 10/1992 |
| FR | 2 691 491 A1 | 11/1993 |
| FR | 2 697 275 A1 | 4/1994 |
| FR | 02 712 329 A1 | 5/1995 |
| FR | 2 781 513 A1 | 1/2000 |
| GB | 356 270 A | 9/1931 |
| GB | 424 057 A | 2/1935 |
| GB | 448 329 A | 6/1936 |
| GB | 585 205 A | 1/1947 |
| GB | 589 635 A | 6/1947 |
| GB | 599 793 A | 3/1948 |
| GB | 636 423 A | 4/1950 |
| GB | 647 812 A | 12/1950 |
| GB | 812 671 A | 4/1959 |
| GB | 1 027 709 A | 4/1966 |
| GB | 1 039 949 A | 8/1966 |
| GB | 1 127 915 A | 9/1968 |
| GB | 1 212 983 A | 11/1970 |
| GB | 1 237 744 A | 6/1971 |
| GB | 1 275 511 A | 5/1972 |
| GB | 1 308 011 A | 2/1973 |
| GB | 1 430 423 A | 3/1976 |
| GB | 2 117 813 A | 10/1983 |
| GB | 2 126 106 A | 3/1984 |
| GB | 2 142 670 A | 1/1985 |
| GB | 2 167 465 A | 5/1986 |
| GB | 2 168 732 A | 6/1986 |
| GB | 2 221 740 A | 2/1990 |
| GB | 2 228 753 A | 9/1990 |
| GB | 2 243 381 A | 10/1991 |
| GB | 2 256 023 A | 11/1992 |
| IT | 444 123 | 1/1949 |
| JP | S54-65528 U | 5/1979 |
| JP | S57-119056 A | 7/1982 |
| JP | S59-41560 A | 3/1984 |
| JP | S59-186336 U | 12/1984 |
| JP | S62-37687 Y2 | 9/1987 |
| JP | H0-1178659 A | 7/1989 |
| JP | H02-285145 A | 11/1990 |
| JP | H03-169967 A | 7/1991 |
| JP | H04-106264 A | 4/1992 |
| JP | H04-191001 A | 7/1992 |
| JP | H05-148984 A | 6/1993 |
| JP | H05-154806 A | 6/1993 |
| JP | H06-146553 A | 5/1994 |
| JP | H06-200611 A | 7/1994 |
| JP | H06-56310 U | 8/1994 |
| JP | H06-315944 A | 11/1994 |
| JP | H06-320510 A | 11/1994 |
| JP | H07-76923 A | 3/1995 |
| JP | H07-180333 A | 7/1995 |
| JP | H07-189466 A | 7/1995 |
| JP | H07-229276 A | 8/1995 |
| JP | H07-279366 A | 10/1995 |
| JP | H07-300979 A | 11/1995 |
| JP | H07-310426 A | 11/1995 |
| JP | 96-1207 A | 2/1996 |
| JP | H08-86078 A | 4/1996 |
| JP | H08-109734 A | 4/1996 |
| JP | H08-270193 A | 10/1996 |
| JP | H09-38906 A | 2/1997 |
| JP | H09-88315 A | 3/1997 |
| JP | 2002-021306 A | 1/2002 |
| KR | 95-33446 U | 12/1995 |
| NL | 7601773 A | 8/1976 |
| NL | 7708519 A | 2/1978 |
| SE | 372 051 B | 12/1974 |
| SE | 450 141 B | 6/1987 |

(56) References Cited

FOREIGN PATENT DOCUMENTS

| | | |
|---|---|---|
| SE | 462 809 B | 9/1990 |
| SE | 501 014 C2 | 10/1994 |
| SE | 502 994 C2 | 3/1996 |
| SE | 9500810-8 | 3/1996 |
| SU | 363795 A1 | 12/1972 |
| SU | 857393 A1 | 8/1981 |
| WO | 84/02155 A1 | 6/1984 |
| WO | 87/03839 A1 | 7/1987 |
| WO | 92/17657 A1 | 10/1992 |
| WO | 93/13280 A1 | 7/1993 |
| WO | 93/19910 A1 | 10/1993 |
| WO | 94/01628 A2 | 1/1994 |
| WO | 94/04773 A1 | 3/1994 |
| WO | 94/22678 A1 | 10/1994 |
| WO | 94/26999 A1 | 11/1994 |
| WO | 95/05274 A1 | 2/1995 |
| WO | 95/06176 A1 | 3/1995 |
| WO | 96/23942 A1 | 8/1996 |
| WO | 96/27719 A1 | 9/1996 |
| WO | 96/27721 A1 | 9/1996 |
| WO | 96/30177 A1 | 10/1996 |
| WO | 97/47834 A1 | 12/1997 |
| WO | 99/66151 A1 | 12/1999 |
| WO | 99/66152 A1 | 12/1999 |
| WO | 00/66856 A1 | 11/2000 |
| WO | 01/48332 A1 | 7/2001 |
| WO | 01/53628 A1 | 7/2001 |
| WO | 01/77461 A1 | 10/2001 |
| ZA | 9705060 A | 4/1998 |

OTHER PUBLICATIONS

"Round the Twist" Wood Based Panels International, 1 page, Jul. 1992.

"The Uniloc System, A Revolution in Laminate Flooring", Contract Flooring Journal, p. 27, Dec. 1996.

18th IUFRO World Congress Division 5, Forest Products, published by Yugoslav IUFRO World Congress Organizing Committee, 7 pages, Jan. 1986.

"Boden Wand Decke", Das Profi-Magazin Fur Bodenbelage und Raumgestaltung, 3 pages, Jan. 1997.

Butec Drawing, ALU Profil-Technik, 1985.

"Selbst Teppichboden, PVC und Parkett Verlegen", Compact-Praxis, "do it yourself", pp. 1-2, 84-87, Copyright 1985.

Daiken Design Execution Material 1995-1996, 7 Pages.

Daiken General Catalog 1995-1996, 6 Pages.

FAX Press Release Quick Step, Uniloc, Nov. 18, 1996, 3 pages.

Fibo-Trespo Alloc, "Der Laminatboden, Der Ohne Leim Verlegt Wird", 31 pages, 1995.

Fibo-Trespo Alloc, Opplaering OG Autorisasjon, 29 pages, 1995.

Fibo-Trespo English, "Revolution at Floor Level", 7 pages, Nov. 20, 1998.

Fibo-Trespo German, "Revolution at Floor Level", 7 pages, Nov. 20, 1998.

Boehme, C., "Kriechverhalten UF-Verleimter MDF", Holz als Rohwerkstoff 50 (1992) 158 162 Springer Verlag 1992, 5 pages.

Holz-Lexikon, Nachschlagewerk fur die holz-und Forstwirtschaft, 17 pages. Copyright 1962.

"Das Ziel: Holzfaserwerkstoffe mit hoher Fertigungstiefe", Holz-Zentralblatt, Stuttgart Nr 7. 1 page, Jan. 15, 1993.

Knight, Edward H., Knights American Mechanical Dictionary Definition of Scarf, 6 pages, vol. III-Per-Zym, New York: Published by Hurd & Houghton, Cambridge: The Riverside Press, Copyright 1876.

Brochure; Kronospan MDF, 4 pages, 1993.

Lueger, Lexikon der Technik, "Hozwerkstoff", 4 pages, Copyright 1961.

Depp, Hans—Joachim et al., "MDF—Mitteldichte Faserplatten", Has-Joachin Deppe and Kurt Ernst, 14 pages, copyright 1996.

MDF Guide d'Utilisation, Published by Euro MDF Board, Allemagne, France, 11 pages, Copyright Nov. 1993.

MDF Produktnorm EMB, Euro MDF Board, 11 pages, Copyright 1995.

MDF User's Manual English, European Associate of Medium Density Fiberboard Manufacturers, 82 pages, Jan. 1993.

Mobil Symposium on Wood-Based Products, Sep. 8, 1995, Magdeburg, Germany.

Partial Translation of Snickeriarbete, 2nd Edition, Malmo 1952, Partial pp. 827 & 855, 1 page.

"Quick-Step Plaatsingssysteem Voor Laminaat", Parketblad 1 page. Dec. 13, 1996.

Larsson, Knut et al., Traindustrins Handbook, Snickeriarbete, 2nd Edition, Malmo 1952, 6 pages.

Rhodes, G.T.A., et al., "MDF—A New Member of the Family of Wood-Based Panels", 9 pages, European Plastic Laminates Forum, 19, 1995.

Topan Arbeitskreis MDF, German Extract, 17 pages, Copyright 1988.

Trabearbetning Partial Translation, Anders Gronlund, 1 page, Partial pp. 358 & 360, Copyright TrateknikCentrum, 1986.

Grondlund, Anders, "Trabearbetning", TrateknikCentrum, 6 pages, Copyright 1986.

"Produktverbesserungen bei Witex Rechtfertigen Preisanpassung",Unternehmen, Euwid Hz Nr 30 v 29, p. 10, 1996.

WKI Gutachterliche Stellungnahme Nr 642-96, 6 pages, dated Apr. 16, 1996.

\* cited by examiner

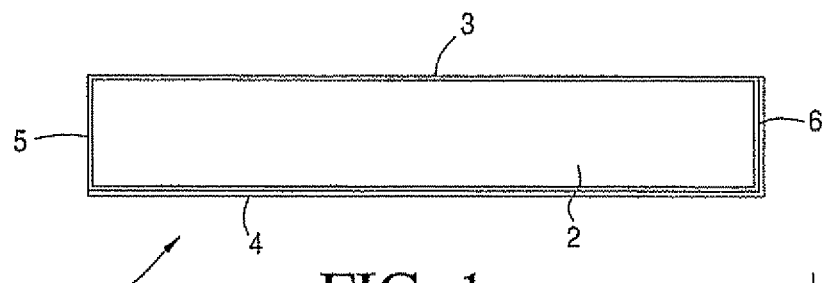
FIG. 1
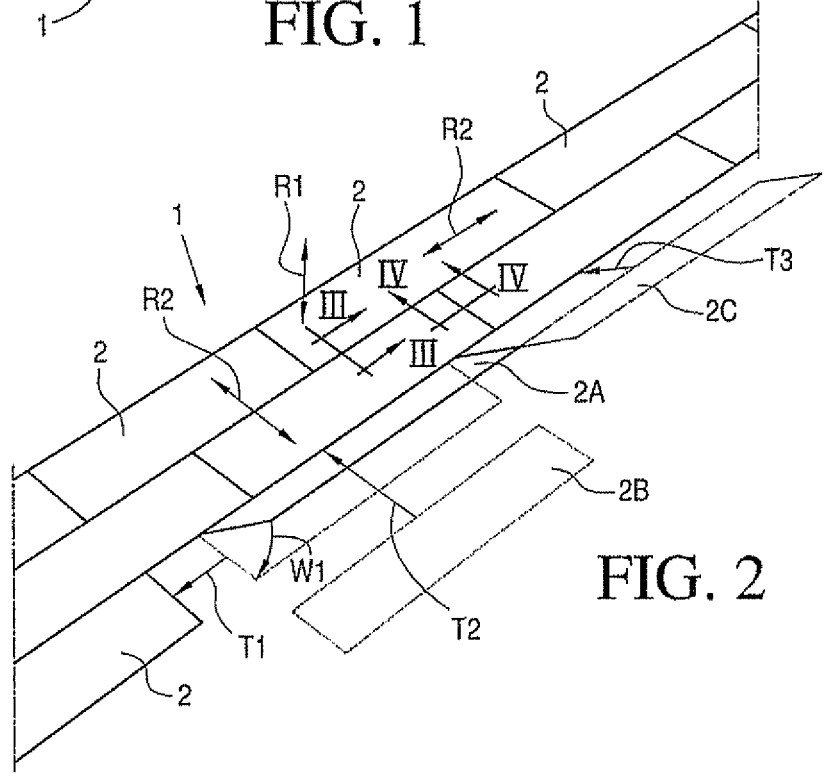
FIG. 2
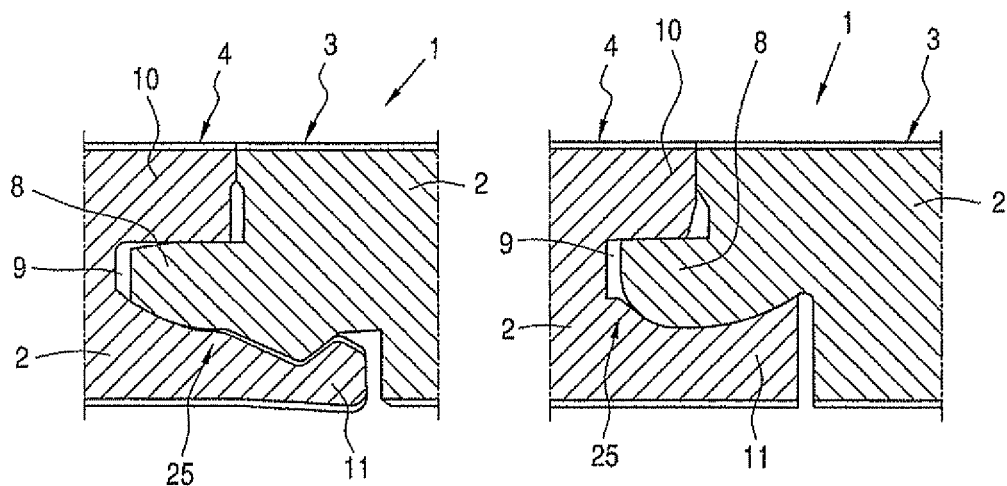
FIG. 4
PRIOR ART
FIG. 5
PRIOR ART

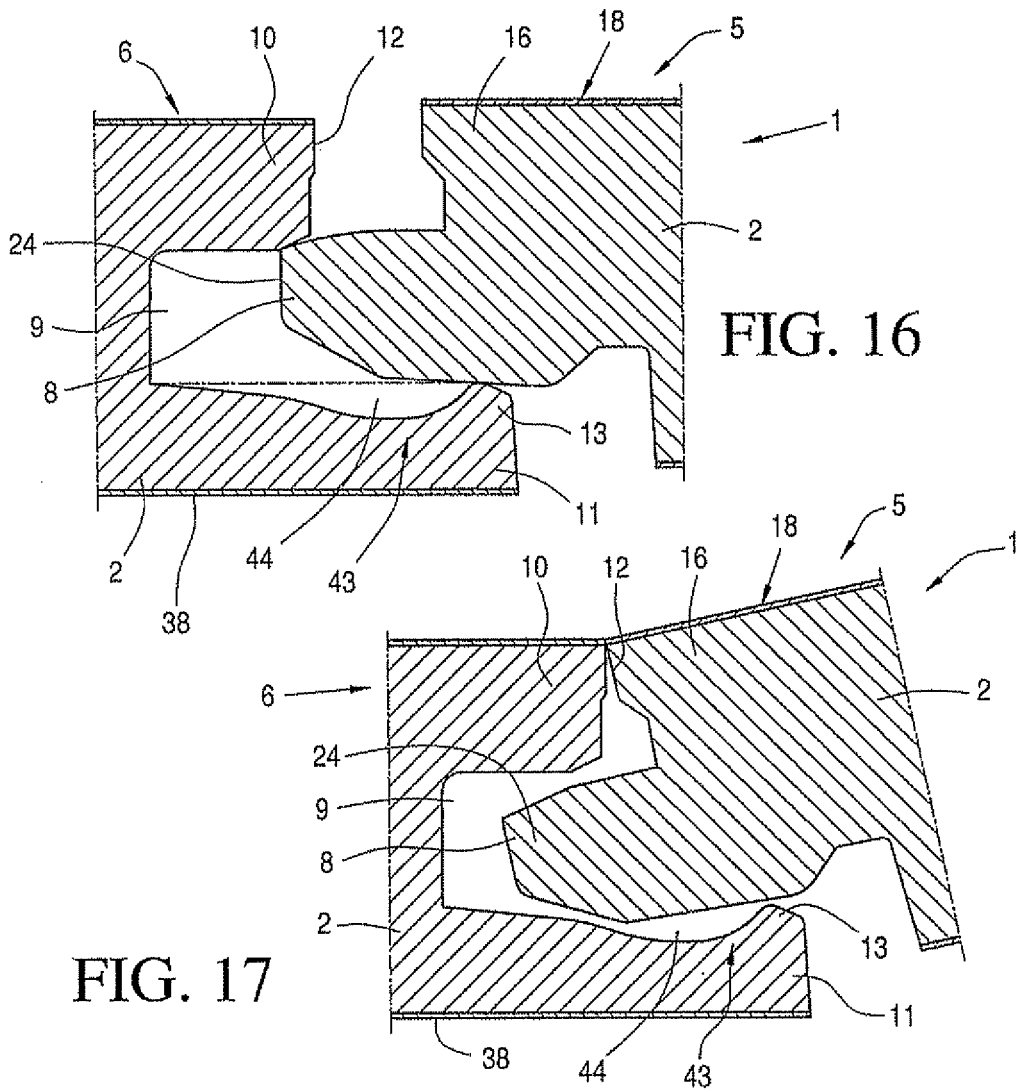
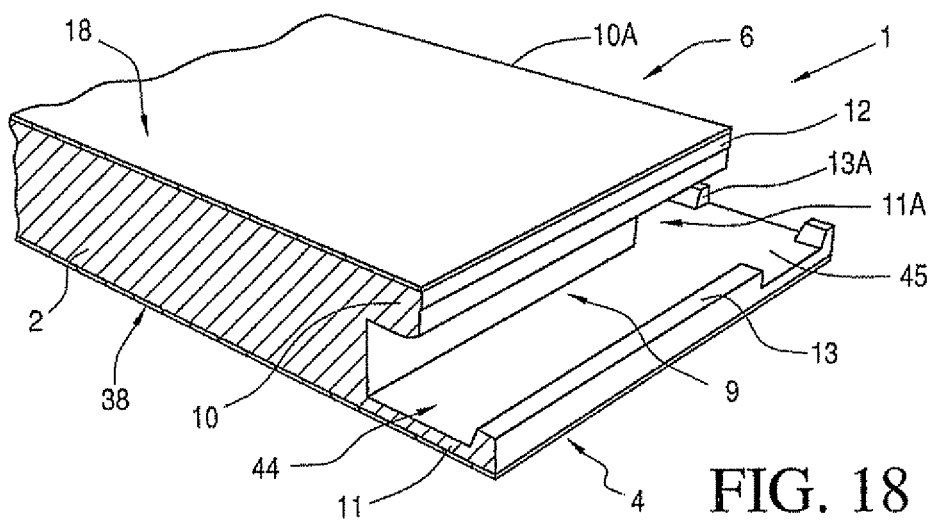

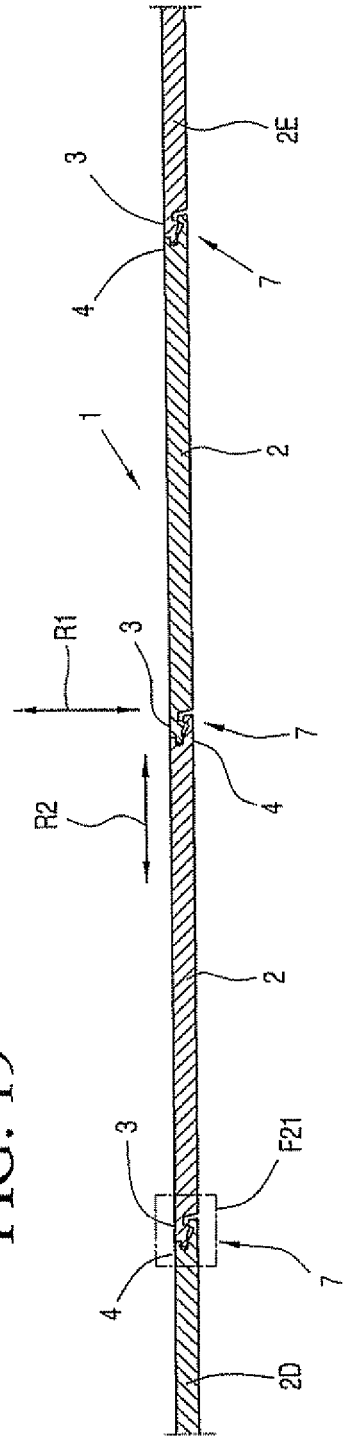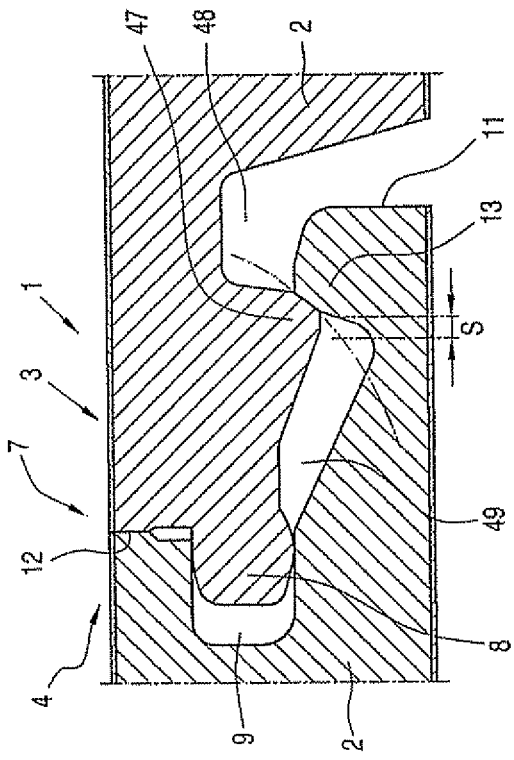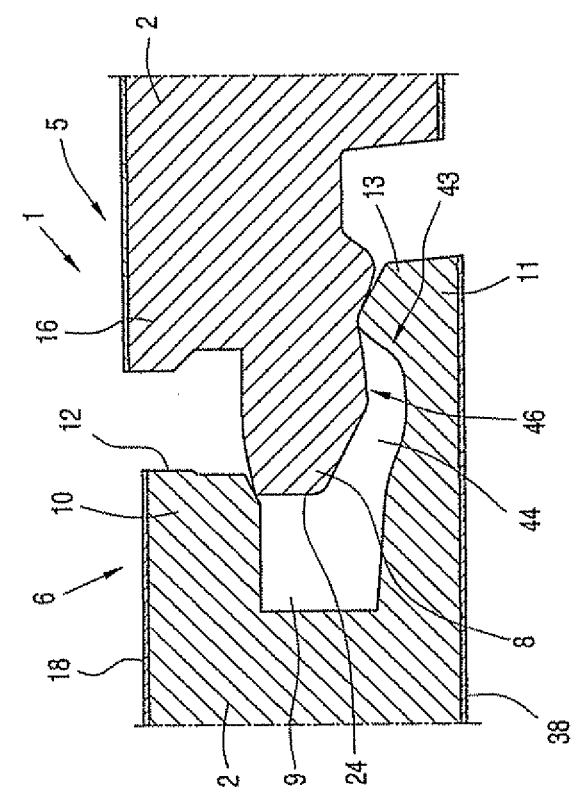

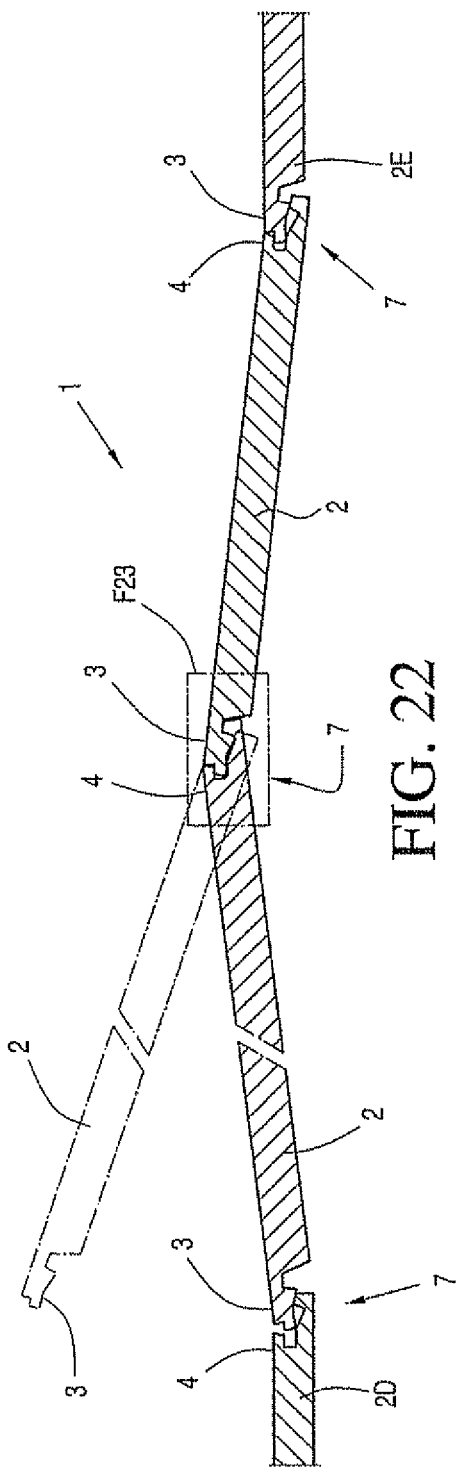
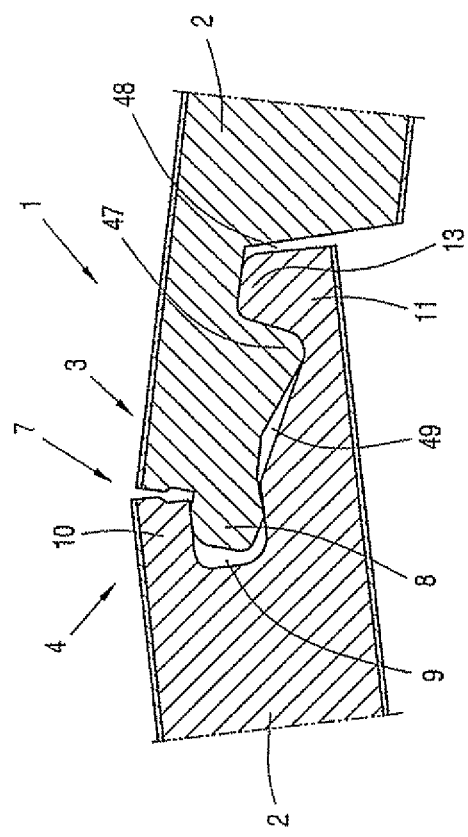

FLOOR COVERING

CROSS-REFERENCE TO RELATED APPLICATION

This application is a continuation of application Ser. No. 14/972,313, filed Dec. 17, 2015, now U.S. Pat. No. 9,334,657, which is a continuation of application Ser. No. 14/723,848, filed May 28, 2015, now U.S. Pat. No. 9,234,356, which is a continuation of application Ser. No. 14/560,704, filed Dec. 4, 2014, now U.S. Pat. No. 9,068,356, which is a continuation of application Ser. No. 14/320,887, filed Jul. 1, 2014, now U.S. Pat. No. 8,904,729, which is a continuation of application Ser. No. 14/093,729, filed Dec. 2, 2013, now U.S. Pat. No. 8,793,958, which is a continuation of application Ser. No. 13/893,556, filed May 14, 2013, now U.S. Pat. No. 8,631,625, which is a continuation of application Ser. No. 12/821,604, filed Jun. 23, 2010, now U.S. Pat. No. 8,438,814, which is a continuation of application Ser. No. 11/979,317 filed Nov. 1, 2007, now U.S. Pat. No. 7,779,597, which is a divisional of application Ser. No. 10/890,456 filed Jul. 14, 2004, now U.S. Pat. No. 7,343,717, which is a divisional of application Ser. No. 09/878,206 filed Jun. 12, 2001, now U.S. Pat. No. 6,772,568.

FIELD OF THE INVENTION

The present invention concerns panels for making a floor covering, in particular of the type consisting of hard panels.

In particular, it concerns laminate panels, also called laminate parquet.

BACKGROUND OF THE INVENTION

It is known that such laminate panels can be made of different layers. Usually, the panels are formed of boards having a wood basis, such as chipboard or fiberboard, in particular MDF (Medium Density Fiberboard) or HDF (High Density Fiberboard), upon which one or several layers, including a decorative layer, are provided at least on the top side. The decorative layer may be a printed paper layer, but in certain embodiments it may just as well be a layer of wood, in particular veneer. Such panels can also be made of other materials, for example merely synthetic material, or of a base plate on the basis of wood, such as chipboard, MDF or HDF and the like, upon which is provided, instead of a printed paper layer or veneer, another material such as cork, thin strips of wood and the like.

It is also known to couple these panels on their edges as they are laid to form a floor covering, either by means of a conventional tongue and groove joint, whereby they are possibly glued together, or by means of a glueless coupling which provides for a mutual interlocking of the panels both in the horizontal and vertical directions, for example as described in U.S. Pat. No. 6,006,486.

The present invention relates to hard panels for floor coverings, in particular laminate panels, which provides for new embodiments according to different aspects offering respective advantages.

BRIEF DESCRIPTION OF THE INVENTION

According to a first aspect, the invention provides for a floor covering panel comprising a hard panel, wherein the panel is provided, at least on two opposite edges, with coupling means made in one piece with the panel, so that several of such panels can be mutually coupled, whereby these coupling means provide for an interlocking in a direction perpendicular to the plane of the coupled panels (vertically active), as well as in a direction perpendicular to the edges concerned and parallel to the plane of the coupled panels (horizontally active), whereby said coupling means comprise a tongue and a groove and whereby the lip which is situated on the bottom side of the groove, hereafter called the lower lip, is longer than the lip on the top side, hereafter called the upper lip, wherein the edge which is provided with the tongue, is made flexible.

As the edge onto which the tongue is provided is elastically flexible, deflections arising during the coupling of the panels are accommodated by this edge, and the above-mentioned upper lip is safeguarded against large deflections, as a result of which the material cannot possibly split due to the bending of the lower lip.

The lower lip is preferably even made rigid, by making it sufficiently thick, so that any bending in this lip is entirely excluded.

According to a first possibility, the above-mentioned flexibility is obtained by making at least the tongue elastically flexible. According to a second possibility, which is preferably combined with the first one, and which contributes even more to the required flexibility being obtained, the tongue is situated on a part which is connected to the actual panel via a flexible zone in the shape of a local constriction.

Specific advantages of the embodiment according to the first aspect are further explained in the following detailed description.

The coupling means are preferably made such that they allow the panels to be coupled by pushing them laterally towards one another.

According to a second aspect, the invention provides for hard panels for forming a floor covering, wherein the panels are provided with coupling means on at least two opposite edges, as a result of which several of such panels can be mutually coupled to one another, wherein these coupling means provide for an interlocking in a direction perpendicular to the plane of the coupled panels, as well as in a horizontal direction perpendicular to the edges concerned, and parallel to the plane of the floor panels, wherein said coupling means comprise a tongue and a groove and whereby the lip situated on the bottom side of the groove, hereafter called the lower lip, is longer than the lip on the top side, hereafter called the upper lip, characterized in that the coupling means consist at least of first coupling parts, formed of contact surfaces working in conjunction with one another, on the top side of the tongue and the bottom side of the upper lip respectively; second coupling parts formed of contact surfaces, on the top side of the lower lip and an opposite part of the other panel respectively; and third coupling parts providing for the horizontal interlocking in the plane of the coupled panels and which are situated on the lower lip, yet further than the free end of the upper lip, wherein these third coupling parts are situated between the first and second ones.

As a result, the vertical forces which are created when walking over the floor covering are divided over two places, which results in a better distribution of the forces.

The third coupling parts preferably consist of an inwardly directed contact surface provided near the free end of the lower lip, on this lip, and a contact surface working in conjunction with it which is formed on the other similar panel to be coupled.

The second coupling parts preferably consist of a contact surface formed on the top side of the free end of the lower lip, as well as a contact surface working in conjunction with it on the bottom side of the other panel.

Moreover, a free space is preferably provided under the tongue extending from the tip of the tongue up to the third coupling parts. As a result, the tongue can be put more easily in the groove, without having to take very precise tolerances into account.

According to a third aspect, the invention provides for a floor covering hard panel, wherein the panel is provided with coupling means on at least two opposite edges, so that several similar ones of such panels can be mutually coupled, wherein these coupling means provide for an interlocking in a direction perpendicular to the plane of coupled panels, as well as in a direction perpendicular to the edges concerned and parallel to the plane of coupled panels, said coupling means comprising a tongue and a groove and wherein the lip which is situated on the bottom side of the groove, hereafter called the lower lip, is longer than the lip on the top side, hereafter called the upper lip, further wherein that the coupling means consist at least of first coupling parts formed of contact surfaces working in conjunction with one another, on the top side of the tongue and the bottom side of the upper lip respectively; second coupling parts formed of contact surfaces, on the top side of the lower lip and an opposite part of the other coupled panel respectively; and third coupling parts which provide for the horizontal interlocking situated on the lower lip, yet further than the free end of the upper lip, whereby the second coupling parts are situated between the first and the third ones, and whereby these second coupling parts consist of contact surfaces working in conjunction with one another and defining a local contact zone situated in the middle or practically in the middle between the tip of the tongue and the third coupling parts.

By making use of such a local contact zone, there remains a space between this zone and the tip of the tongue, on the bottom side of the latter, which makes sure that there is freedom of movement for the tongue when the panels are joined.

According to a fourth aspect, the invention provides for a floor covering hard panel, wherein the panel is provided with coupling means on at least two opposite edges made in one piece with the panel, as a result of which several of such panels can be mutually coupled to one another, whereby these coupling means provide for an interlocking in a direction perpendicular to the plane of the coupled panels, as well as in a direction perpendicular to the edges concerned, and parallel to the plane of the coupled panels, wherein said coupling means comprise a tongue and a groove, further wherein the lip situated on the top side of the groove, hereafter called the upper lip, is longer than the lip situated on the bottom side of the groove, hereafter called the lower lip, and in that the above-mentioned coupling means contain coupling parts which provide for the interlocking in the horizontal direction in the plane of coupled panels, wherein these coupling parts consist at least of contact surfaces working in conjunction with one another, provided on the bottom side of the upper lip, outside the distal end of the lower lip, and on the opposite part of the edge of the other panel respectively.

As the interlocking takes place on the upper lip, it is easier to check the reliability of the interlocking while the floor is being laid than in the case where the interlocking takes place on the lower lip.

According to a fifth aspect, the invention provides for a floor covering panels comprising hard panels, whereby each panel is provided with coupling means on at least two opposite edges made in one piece with the panel, as a result of which several of such panels can be mutually coupled to one another, whereby these coupling means provide for an interlocking in a direction perpendicular to the plane of the coupled panels, as well as in a horizontal direction perpendicular to the edges concerned, and parallel to the plane of the coupled panels, whereby said coupling means comprise a tongue and a groove, and wherein the lip situated on the top side of the groove, hereafter called the upper lip, is longer than the lip situated on the bottom side of the groove, hereafter called the lower lip, and in that the above-mentioned coupling means contain coupling parts which provide for the interlocking in the horizontal direction, whereby these coupling parts make it possible for these panels to be mutually disconnected by turning them down toward their bottom sides and towards one another.

Thanks to the use of coupling means which make it possible for the panels to be disconnected by turning them downward, and preferably to be exclusively disconnectable by this movement, the panels fit particularly tight on the coupling means concerned, and are pushed even closer towards one another when being walked on.

The panels are hereby preferably rectangular, and they are provided with coupling means on two pairs of edges which make it possible for the panels to be disconnected by means of an upward rotation in order to be unlocked, whereas, on the other pair of edges, as mentioned above, they are provided with coupling means which only allow for a disconnection by turning the coupled panels with their bottom side towards one another. Also the opposite turning movements increase the guarantee that such a coupling remains always available.

It should be noted that in the case of longitudinal panels, the coupling means which allow for a disconnection by turning the panels upward are preferably provided on the longitudinal sides, whereas the coupling means which allow for a disconnection by turning the panels down, are preferably provided on the shortest sides.

According to a sixth aspect, the invention provides for floor covering panels wherein the panels are provided with coupling means on at least two opposite edges made in one piece with the panels, as a result of which several of such panels can be mutually coupled to one another, whereby these coupling means provide for an interlocking in a vertical direction perpendicular to the plane of the coupled panels, as well as in a horizontal direction perpendicular to the edges concerned and parallel to the plane of the coupled panels, wherein said coupling means comprise a tongue and a groove, and further wherein the interlocking in the horizontal direction is at least provided by coupling parts in the shape of a local protrusion in the top side of the above-mentioned tongue, which meshes in a recess in the lip which borders the top side of the groove.

An advantage of this embodiment consists in that, since the protrusion is local, the recess can also have relatively small dimensions, and the upper lip is only weakened locally.

According to the sixth aspect, there is preferably no interlocking in the horizontal direction on the lower lip.

According to a seventh aspect, the invention provides for hard floor covering panels, wherein the panels are provided with coupling means on at least two opposite edges made in one piece with the panels, as a result of which several of such panels can be mutually coupled to one another, wherein these coupling means provide for an interlocking in a vertical direction perpendicular to the plane of the coupled panels, as well as in a horizontal direction perpendicular to the edges concerned and parallel to the plane of the coupled panels, and whereby:

the above-mentioned coupling means comprise a tongue and a groove, wherein this groove is bordered by a lower lip on the bottom side of the groove and an upper lip on the top side of the groove hereafter called the lower lip and the upper lip respectively, and further wherein the distal end of the upper lip defines or intersects a vertical plane, hereafter called plane V1;

the lower lip is distally longer than the upper lip;
there is an interlocking part on the part of the lower lip which extends past the free end of the upper lip, with a contact surface which, when coupled, works in conjunction with a contact surface which is provided on the other panel, whereby these contact surfaces form a contact zone when coupled, whose center defines or intersects a vertical plane, hereafter called plane V2;
before the above-mentioned interlocking part, in the direction of the groove, there is formed a space in the lower lip which is open on the top side;
in the coupled situation, there is a contact zone in the cross section in which the top side of the tongue makes contact with the bottom side of the upper lip, whereby the point of this contact zone which is situated most inwardly defines or intersects a first vertical plane, hereafter called plane V3, the most outwardly situated point of this contact zone defines or intersects a second vertical plane, hereafter called plane V4, and both planes V3 and V4 define a vertical plane situated right in between, hereafter called plane V5;
the top side of the interlocking part defines a horizontal level, hereafter called level N1;
the bottom side of the part upon which the tongue is provided and which extends from the tip of the tongue to the interlocking zone, defines a horizontal level, hereafter called level N2;
the levels N1 and N2 define a horizontal level situated right in between, hereafter called level N3;
the average height of the contact zones between the top side of the tongue and the bottom side of the upper lip define a horizontal level, hereafter called level N4;
the distance between the planes V1 and V2 is at least half of the distance between the levels N3 and N4;
wherein the floor covering further possesses at least in combination the following characteristics:
  that the panels, and basically also the above-mentioned lips, are made of fiberboard of the type MDF or HDF;
  that the coupling means are made such that the panels can be assembled by pushing them towards one another; and
  that the above-mentioned space extends to beneath the upper lip, such that this space is in conformity with at least one of the following two characteristics:
  a) that the part of this space which is situated under the level N3 extends inwardly to at least past the plane V1;
  b) that the part of this space which is situated under the level N1 extends inwardly to at least past the plane V5.

When all the above-mentioned criteria are met, an embodiment is obtained according to the invention whereby the above-mentioned space is relatively large compared to the other parameters on the one hand, and, thanks to the specific application of the MDF or HDF material, the structure nevertheless remains sufficiently stable on the other hand. The relatively large space which is formed in the lower lip offers the advantage that the tongue can be located in the groove more easily, as well as the advantage that the tongue can be made relatively massive.

According to a particular embodiment, this floor covering panel is characterized in that the panel is rectangular and in that coupling means are formed on both pairs of edges which offer an interlocking in the horizontal and vertical directions, wherein these coupling means are formed as mentioned above on at least one pair of said edges, and whereby on at least two edges intersecting at right angles to one another, use is made of a groove which is bordered by an upper lip and a lower lip respectively, whereby the lower lip each time protrudes further than the upper lip, such that two such longer lips meet in at least one angle of the panel, whereby at least the above-mentioned space continues up to the end of the panel in said angle, in other words extends through the far end of the lip standing at right angles. As the above-mentioned space is made continuous, also a large flexibility can be guaranteed in the angle concerned, as the interlocking parts of the longitudinally directed lower lip and the transversely directed lower lip are then disconnected by this continuous recess.

According to an eight aspect, the invention provides for floor covering hard panels, whereby these panels are provided with coupling means on at least two opposite edges made in one piece with the panels, as a result of which several of such panels can be mutually coupled to one another, whereby these coupling means provide for an interlocking in a vertical direction perpendicular to the plane of the coupled panels, as well as in a horizontal direction perpendicular to the edges concerned and parallel to the plane of the coupled panels, and whereby:
  the above-mentioned coupling means comprise a tongue and a groove, wherein the groove is bordered by a lip on the bottom side and the top side of the groove, hereafter called the lower lip and the upper lip respectively;
  the lower lip is longer than the upper lip;
  there is an interlocking part on the part of the lower lip which extends past the free end of the upper lip, with a contact surface which, when coupled, works in conjunction with a contact surface which is provided on the other coupled panel; and
  before the above-mentioned interlocking part, in the direction of the groove, is formed a space in the lower lip which is open on the top side;
  wherein the coupling means are made such that the panels can be assembled by pushing them towards one another while in a generally common place, and in that in the bottom side of the part onto which the tongue is provided, and which extends from the tip of the tongue up to the interlocking zone, is provided a depression, such that this depression co-operates with the interlocking part in a position at which the tongue is situated in front of the groove. Thus is obtained that, while the tongue is being fit in, the interlocking part is located in the depression, so that the tongue is better positioned in front of the groove of the other panel.

Floor coverings consisting of hard panels known until now, and which allow for a glueless interlocking, do not enable temporary removal of individual panels from the middle of the floor covering after the floor covering has been entirely laid. This is disadvantageous in that it is difficult to replace damaged panels, as well as impossible to locally remove the floor covering, for example to work on or in the rough floor, to lay or remove cables under the floor covering, etc. With the known systems, the panels always need to be systematically removed from an edge of the floor covering.

According to a ninth aspect, the invention aims to provide floor covering hard panels, whereby it is possible to remove any coupled panel whatsoever from an existing floor covering made of coupled panels, and to put it back, without the floor covering having to be systematically broken up from an edge of the whole.

According to this ninth aspect, the invention to this end provides for a floor covering hard panel, wherein the panel is provided with coupling means on at least two opposite edges made in one piece with the panel, as a result of which several of such panels can be mutually coupled to one another, whereby these coupling means provide for an interlocking in a vertical direction perpendicular to the plane of the coupled panels, as well as in a horizontal direction perpendicular to the edges concerned and parallel to the plane of the coupled panels, whereby the above-mentioned coupling means are made such that two coupled panels, starting from a flat position, can be turned towards one another toward their bottom sides over at least a certain angle and this turning movement makes it possible for said two panels to be removed from in between other adjacent coupled panels.

According to a first preferred embodiment, the coupling means are made such that the two coupled panels, when they are situated in a floor covering, may be lifted along their coupled edges, such that there is a disconnection on at least one of the opposite edges that is coupled with adjacent panels.

According to a second preferred embodiment, the coupling means are made such that the two coupled panels, when they are situated in a floor covering, may be lifted along their coupled edges, such that the coupling, in particular the vertical coupling, is interrupted along the edges concerned and a disconnection along the coupled edges becomes possible.

According to a particularly practical embodiment, the floor covering panel is characterized in that the coupling means mainly consist of a tongue and a groove, whereby the lip which is situated on the bottom side of the groove is longer than the lip on the top side of the groove, and the interlocking is obtained mainly in the horizontal direction thanks to an interlocking part on the lip situated on the bottom side of the groove and an interlocking part working in conjunction with it on the bottom side of the other coupled panel, whereby these coupling means make it possible for the panels to be assembled by means of a turning movement and whereby, in the coupled position, spaces are provided above the first-mentioned interlocking part as well as under the second-mentioned interlocking part which allow for a further turning movement.

The above-described aspects of the invention may occur independently or they can be mutually combined, in any possible combination, provided the embodiments as described according to the above-mentioned aspects do not have conflicting characteristics.

DESCRIPTION OF THE DRAWINGS

In order to better explain the characteristics of the invention, the following preferred embodiments are described as an example only without being limitative in any way, with reference to the accompanying drawings, in which:

FIG. 1 schematically represents a hard flooring panel;

FIG. 2 schematically represents a part of a floor covering made of hard panels shown in FIG. 1;

FIG. 4 represents a section according to prior art viewed along line IV-IV in FIG. 2;

FIG. 5 represents a variant of FIG. 4;

FIGS. 16 and 17 represent the coupling means of FIG. 15 in two other positions;

FIG. 18 represents an angular part of a panel according to the invention;

FIG. 19 represents a section of another embodiment according to the invention;

FIG. 20 represents a section of another embodiment of a floor covering made of panels according to the invention;

FIG. 21 represents the part indicated by F21 in FIG. 20 on a larger scale;

FIG. 22 represents how the panels of the floor covering from FIG. 20 can be disconnected and connected respectively;

FIG. 23 represents the part indicated by F23 in FIG. 22 on a larger scale;

DETAILED DESCRIPTION OF PREFERRED EMBODIMENTS OF THE INVENTION

As represented in FIGS. 1 and 2, the invention concerns hard floor covering panels 2 from which a floor covering 1 may be formed by coupling of the panels.

As described in U.S. Pat. No. 6,006,486, it is known that such panels 2 can be connected without any glue being required by making use of coupling means which, when the panels 2 are rectangular, provide for an interlocking in a direction R1, perpendicular to the plane of the floor covering 1, at least on one pair of opposite edges 3-4, and preferably on both pairs of edges 3-4, 5-6 respectively, as well as in a direction R2 perpendicular to the edges 3-4 or 5-6 concerned, and parallel to the plane of the floor covering 1.

Coupling means can be used which allow for different coupling methods, but preferably coupling by rotating the panels relative to each other as well as by pushing the panels together while in a generally common plane. The latter makes it possible for such panels 2 to be coupled to one another in a known manner by first rotating them into one another on their edges 3-4, as represented by means of the panel 2A in FIG. 2 with a movement of rotation W1, and by subsequently snapping them together on their edges 5-6 by means of a translation motion T1. According to a variant, the connection on the edges 3-4 of the panels 2 concerned, can also be realized by starting from a position as is schematically indicated by reference 2B, and coupling the panel 2 concerned by means of a translation T2.

Also, while a panel 2A is maintained in the rotated position, a following panel 2C can be coupled to the edges 5 and 6 concerned, either by means of a translation T3, or by means of a mutual rotation between the panels 2A and 2C, after which both panels 2A and 2C are then turned down so as to be locked to the preceding row of panels.

As mentioned in the introduction, the present invention provides different new embodiments of coupling means to mutually connect such panels 2.

Figure 3:
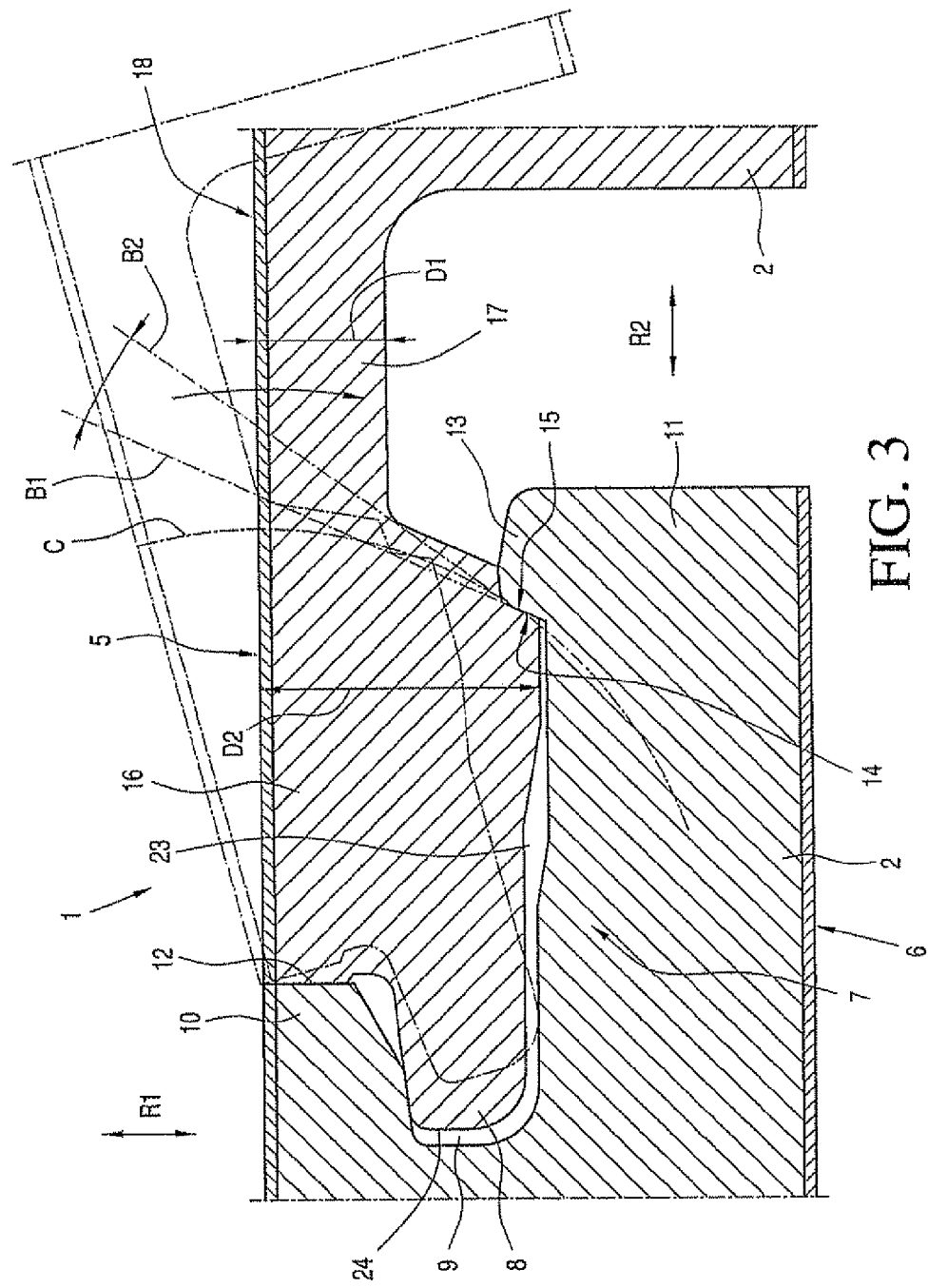
FIG. 3 represents an embodiment of coupling means of coupled panels according to the invention applied in a floor covering, seen from a section which corresponds for example to section III-III in FIG. 2.

FIG. 3 represents an embodiment according to a first aspect of the invention.

Also, in this embodiment, the floor covering 1 comprises hard panels 2 which are provided with coupling means 7 made in one piece with the panels 2 on at least two opposite edges, in this case 5-6, so that several of such panels 2 can be mutually connected to one another. These coupling means 7 provide for an interlocking in the direction R1, as well as R2.

Further, these coupling means 7 have a tongue 8 provided on the edge 5, and a groove 9 provided on the edge 6, in which the tongue 8 fits. The groove 9 is hereby bordered on the top side by means of a lip 10, hereafter called the upper lip. At the bottom, it is bordered by a lip 11, hereafter called the lower lip, which is longer than the upper lip 10, in other words, which extends further than the distal end 12 of the lip 10 in the horizontal direction away from groove 9.

The interlocking in the direction R2 is obtained as the lower lip 11 forms an interlocking part 13 with an inwardly directed contact surface 14 which can co-operate with an opposite contact surface 15 formed on the edge 5 when being coupled.

According to the invention, the panel edge 5 which is provided with the tongue 8 is made elastically flexible, whereas the lip 11 is preferably made rigid, the latter by making it relatively thick, as is clearly visible in FIG. 3.

The panel edge 5 is made such that it can elastically bend in several places. Thus, for example, the tongue 8 is flexible, but even more important is that this tongue 8 is preferably situated on a part 16, as represented, which is connected to the actual panel 2 via a flexible zone 17 in the shape of a local constriction or reduced cross-section.

This flexible zone 17 is preferably situated on the place as indicated in FIG. 3, in other words seen as of the tongue 8, past the contact surface 15, and said flexible zone 17 has a thickness D1, according to the direction R1, which is smaller than half the thickness of the panels 2 and/or smaller than ⅔ of the thickness D2 of the part 16 upon which the tongue 8 is situated.

If the panels 2 are made of fiberboard, of the type MDF or HDF, the thickness D1 is preferably even smaller than 3 mm, and better still smaller than 2 mm.

The flexible zone 17 is situated against the top side 18 of the panel 2 concerned, which is particularly useful when MDF or HDF board is used, as such materials have a larger density on the outer surfaces, and thus the thickness on these places can be maximally reduced so as to obtain an optimal flexibility.

Apart from the advantages already mentioned in the introduction, the invention according to the first aspect also offers the following advantageous characteristics:

As the contact surface 14 is situated relatively high, said contact surface 14 can be provided in a more vertical position, without much deviation from the tangential directions B1 and B2 represented in FIG. 3. Thus is obtained a solid interlocking.

As the flexibility of the connection is situated in the top side of the panel, this results in the interlocking being pulled even more tightly together when a tensile force is exerted on the panels.

In the design of FIG. 3 is created a stress concentration on the top side of the panel 2, right behind the tongue 8, which results in a bending. As a consequence, the stress concentration is transferred to the strongest place of the board. During the joining, it is practically impossible for forces to be created in the deepest point of a groove 9, so that it is almost excluded that splits are created at this deepest point.

According to a second aspect of the invention, which in the given example of FIG. 3 is combined with the above-mentioned first aspect, the coupling means 7 consist at least of first coupling parts formed of contact surfaces 19-20 working in conjunction with one another, on the top side of the tongue 8 and the bottom side of the upper lip 10 respectively; second coupling parts formed of contact surfaces 21-22, on the top side of the lower lip 11 and the opposite part 16 of the other panel 2 respectively; and third coupling parts which provide for the horizontal interlocking situated on the lower lip 11, but further than the free end 12 of the upper lip 10, formed of the above-mentioned contact surfaces 14 and 15. What is special here, is that the third coupling parts are situated between the first and the second ones.

The second coupling parts are preferably situated immediately next to the third coupling parts. The contact surface 21 is hereby formed of the top side of the above-mentioned interlocking part 13, whereas the contact surface 22 is situated precisely opposite to it.

According to the embodiment of FIG. 3, there is a free space 23 under the tongue 8 which extends from the tip 24 of the tongue 8 up to the third coupling parts, in other words the contact surface 14.

The coupling means 7 are mainly designed to be provided on one pair of edges 5-6, whereas coupling means 25 are preferably provided on the other edges 3-4, as represented in FIG. 4 or FIG. 5, which are described in U.S. Pat. No. 6,006, 486 and which make it possible for the panels 2 concerned to be assembled along their top edges and, disassembled, respectively at least by means of a movement of relative rotation. In the case where the panels 2, as represented, are longitudinal, the coupling means 7 will preferably be provided on the short edges 5-6.

The above-described arrangement does not exclude, however, that the coupling means 7 may be provided on both pairs of edges 3-4 and 5-6, or on the longitudinal edges 3-4, whereas another connection is provided for on the short edges.

Nor is it excluded to provide the panels 2 on merely one pair of edges with coupling means, in this case the coupling means 7.

Figure 6:
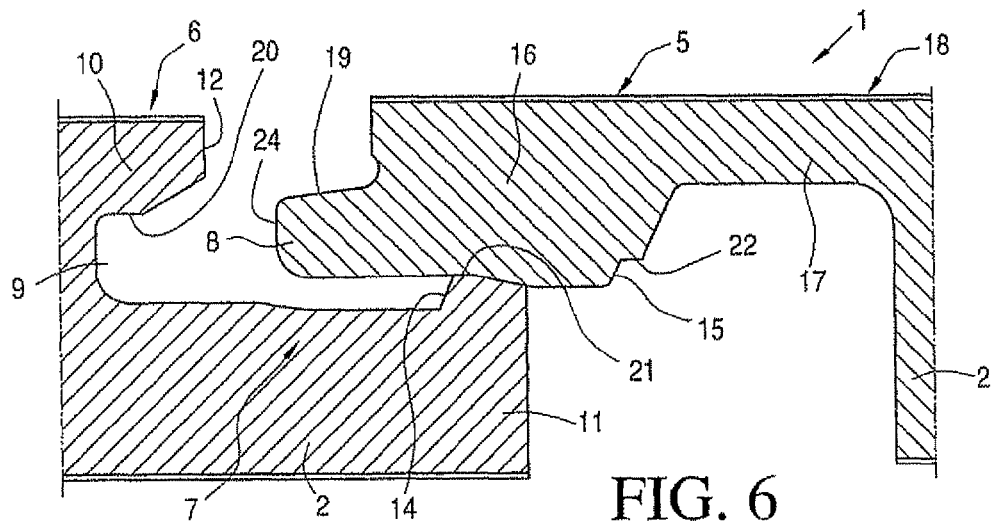
FIGS. 6 to 8 represent the coupling means from FIG. 3 in different positions.
Figure 7:
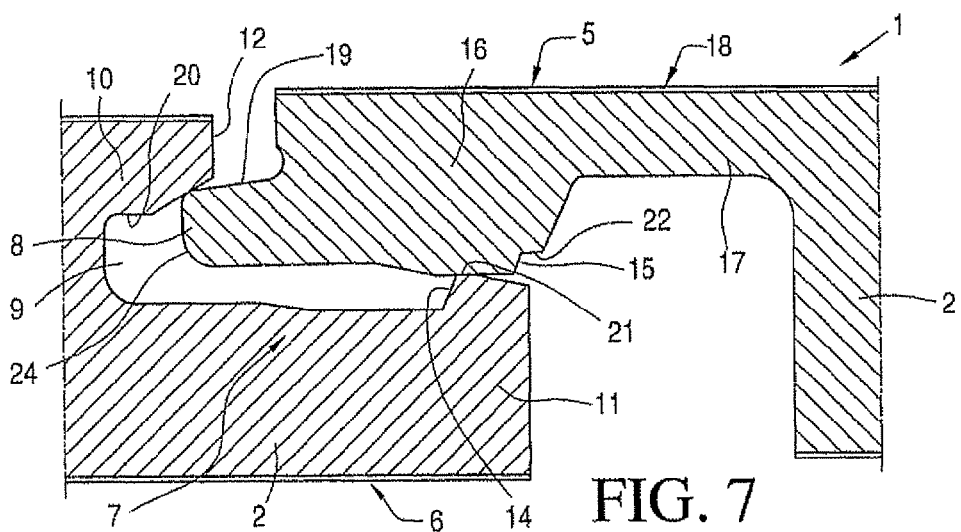
Figure 8:
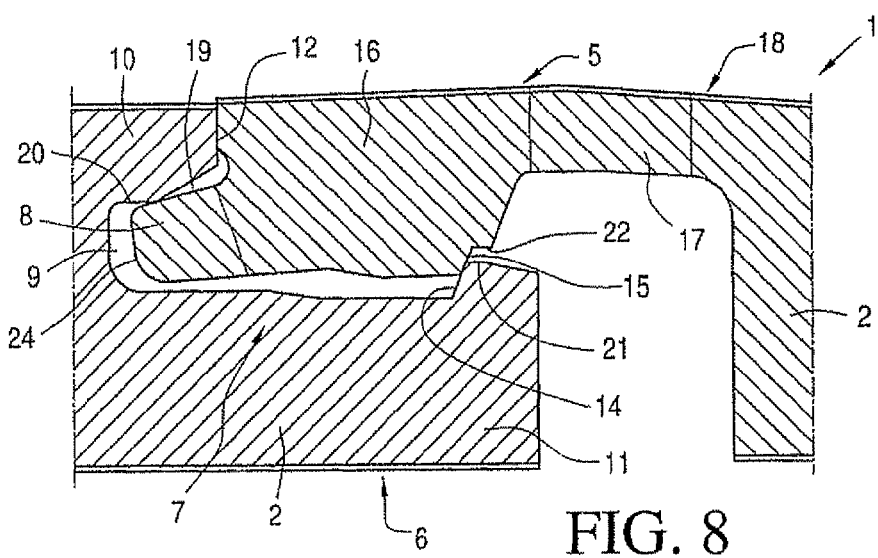

Further, the coupling means 7 are preferably made such that the panels 2 with their edges concerned, in this case the edges 5 and 6, can be connected to one another by pushing the panels 2 freely towards one another, as is represented step by step in FIGS. 6 to 8, and as will be further described into more detail. Moreover, the coupling means 7 are made such that the edges concerned, in this case the edges 5 and 6, can also be connected to one another by means of a movement of relative rotation, and disconnected, respectively, as is represented by means of a dot and dash line in FIG. 3.

The laying of the floor covering 1, with panels 2 containing coupling means 7, can then for example, yet not necessarily, be carried out as follows. In a situation as represented in FIG. 2, the panel 2A is first connected with its edge 3 to an edge 4 of already laid panels by presenting the panel 2A at an angle and by rotating the above-mentioned edges 3-4 into one another, so that a connection such as for example in FIG. 4, or, as an alternative, FIG. 5, is created.

Then, the panel 2A can be connected to the preceding panel with a translation T1, whereby the situations as represented in FIGS. 6 to 8 are successively observed on the coupling means 7. It is clear that this is accompanied by an elastic bending in the tongue 8, and to a larger extent also in the flexible zone 17, whereby the part 16 with the contact surface 15 finally snaps down behind the contact surface 14.

Figure 9:
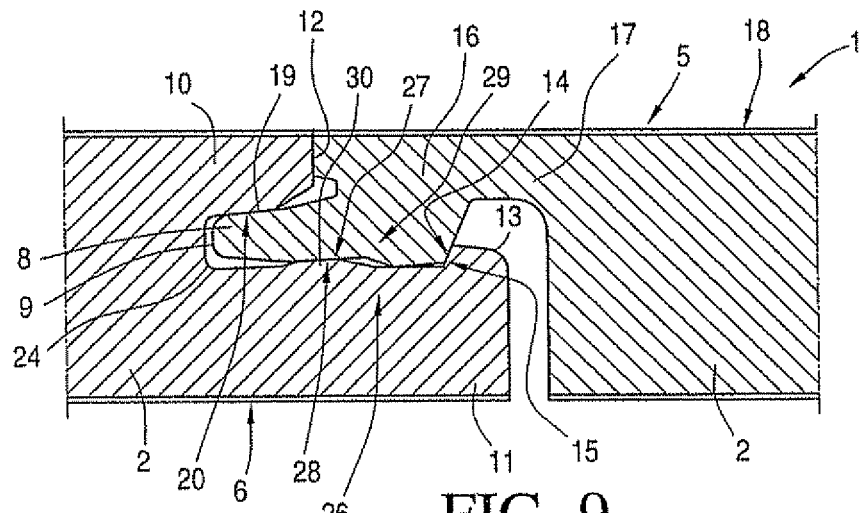
FIG. 9 represents a variant of the coupling means from FIG. 3.

FIG. 9 represents an embodiment which is realized according to the above-mentioned third aspect of the invention. The coupling means 26 used hereby represent first coupling parts analogous to the coupling means 7, formed by contact surfaces 19 and 20, and third coupling parts formed by contact surfaces 14 and 15. What is special in this example, is that the above-mentioned second coupling parts are situated between the first and third ones, and that the second coupling parts consist of contact surfaces 27-28 working in conjunction with one another and which define a local contact zone 29 which is situated in the middle or practically in the middle between the tip 24 of the tongue 8 and the third coupling parts, in other words the contact surface 14.

As represented in FIG. 9, a bulge or protrusion 30 can be provided in the lower lip 11 on the contact zone 29.

FIGS. 10 to 13 represent an embodiment for different positions with coupling means 31 which are in conformity with a fourth aspect of the invention. The upper lip 10 is hereby longer than the lower lip 11, and the coupling means which realize the interlocking in the horizontal direction consist of coupling parts formed of contact surfaces 32-33 working in conjunction with one another, which are provided on the bottom side of the upper lip 10, outside the distal end of the lower lip 11, and on the opposite part of the edge of the other panel 2 respectively.

Figure 10:
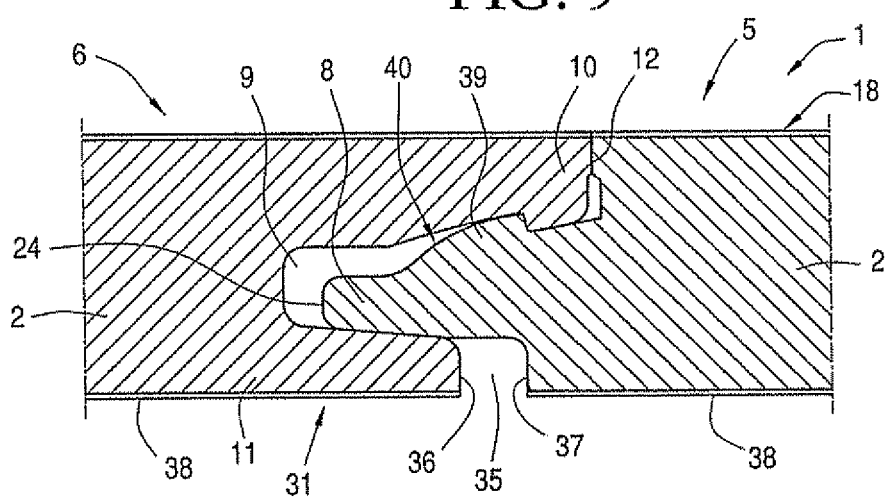
FIG. 10 represents another variant.
Figure 11:
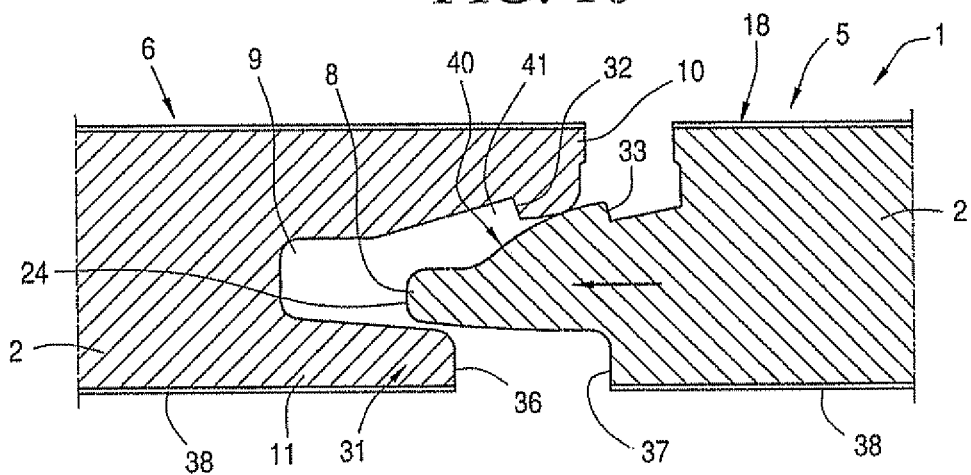
FIGS. 11 to 13 represent the variant from FIG. 10 in different positions.
Figure 12:
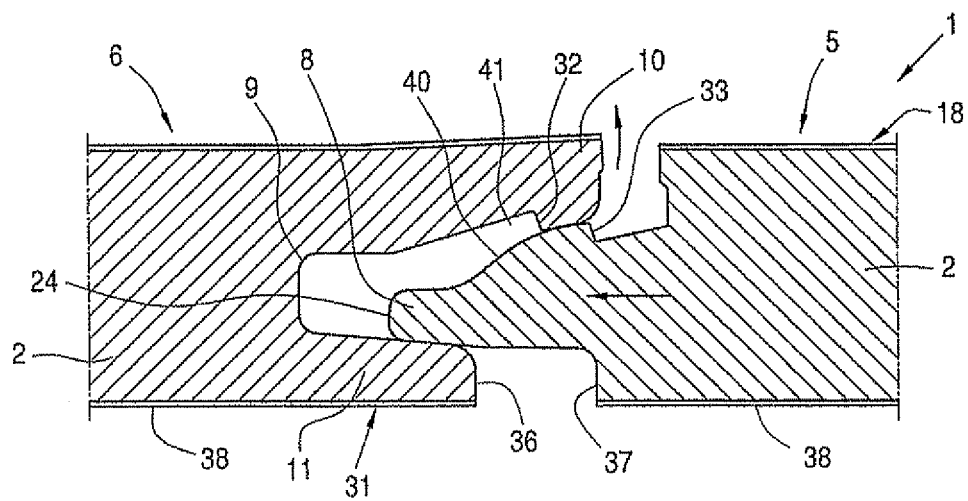

The coupling means 31 are hereby made such that the connection can be realized by pushing the panels 2 towards one another with the edges 5-6 concerned, for example over a base, whereby they systematically fit into one another, as represented in FIGS. 10 to 12.

As shown in the figures, the tongue 8 has one end 24 which has been made thinner. There is also a free space 35 between the free end 36 of the lower lip 11 and the opposite part 37 under the tongue 8 of the other panel 2.

Figure 13:
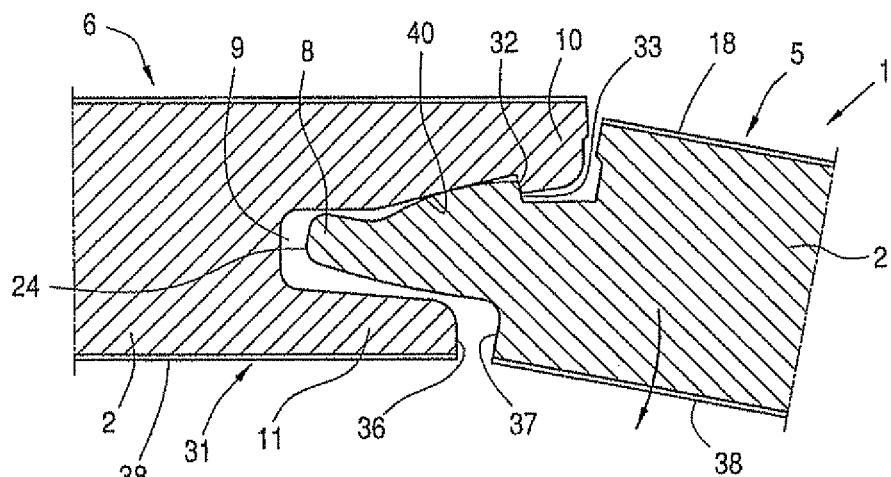

The embodiment of FIGS. 10 to 13 also illustrates a fifth aspect of the invention, in other words that the edges, in this case the edges 5-6, are provided with coupling means 31 which make it possible for the panels 2 concerned to be mutually disconnected by rotating them towards their bottom sides 38 and towards one another, as is specifically shown in FIG. 13. The above-mentioned space 35 is helpful thereby.

The embodiment of FIGS. 10 to 13 also corresponds to a sixth aspect of the invention, wherein the interlocking in the horizontal direction is formed of coupling parts in the shape of a local protrusion 39 in the top side 40 of the above-mentioned tongue 8, which meshes in a recess 41 in the upper lip 10.

Figure 14:
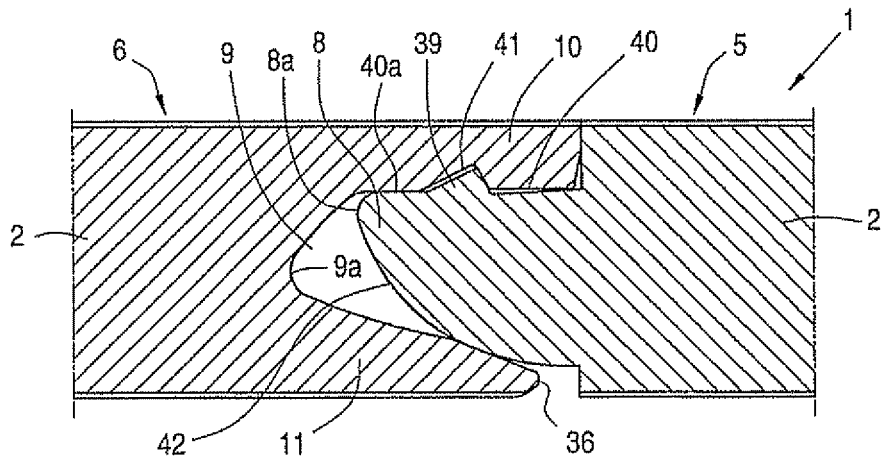
FIG. 14 represents another variant.

FIG. 14 represents a variant which also applies the above-mentioned characteristics of the sixth aspect of the invention.

Other particularities of this embodiment, which must not all be combined according to variants which are not represented, consist in that the top side 40 of the tongue 8, with the exception of the local protrusion 39, is mainly parallel to the surface of the floor covering 1, and in that the bottom side 42 of the tongue 8 is mainly formed of a smoothly bent surface which reaches up to the top side 40 of the tongue 8. Also this embodiment makes it possible for the panels 2 to be assembled by means of a mainly horizontal movement as well as rotational movement about the coupled edge.

As seen in FIG. 14, the groove 9 has an innermost point 9a. The recess 41 is located within the portion of the groove 9 which is located between the innermost point 9a of the groove and the distal end 36 of the lower lip 11. It will also be evident that the bottom side of the tongue 8 at least in the region of the tongue located directly underneath the protrusion 39 and underneath the portion of the top side of the tongue extending from the protrusion 41 to the distal end 8a of the tongue is free from horizontally active coupling parts. It will also be evident from FIG. 14 that the protrusion 41 is located at a distance proximally inwardly from an imaginary vertical transverse plane intersecting the distal tip 8a of the tongue 8. A portion 40a of the top side of the tongue 8 extends generally parallel with the plane of the floor panel and forms a contact surface cooperating with the lower side of the upper lip 10.

Figure 15:
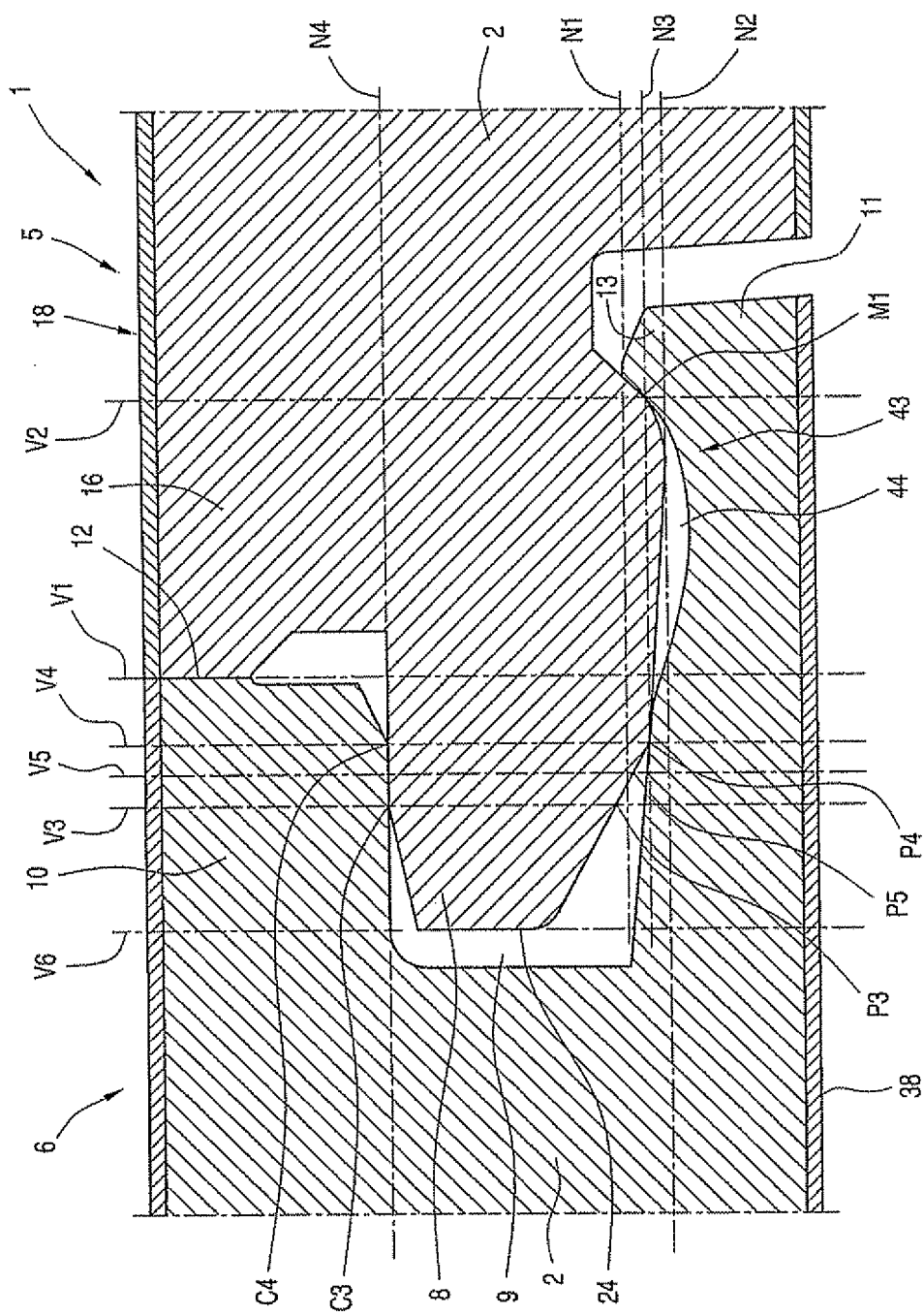
FIG. 15 represents yet another variant.

FIG. 15 represents a connection with coupling means 43 realized according to a seventh aspect of the invention. It concerns a connection whereby:

the coupling means 43 comprise a tongue 8 and a groove 9, whereby this groove 9 is bordered on the bottom and top sides, respectively, by a lip, hereafter called the lower lip 11 and the upper lip 10, respectively, wherein the distal end 12 of the upper lip 10 defines (i.e., intersects) a vertical plane, hereafter called plane V1;

the lower lip 11 is longer than the upper lip 10;

there is an interlocking part 13 on the part of the lower lip 11 which extends past the free end 12 of the upper lip 10, with a contact surface 14 which, when coupled, works in conjunction with a contact surface 15 which is provided on the other panel 2, whereby these contact surfaces 14-15 form a contact zone when coupled, whose center M1 intersects a vertical plane, hereafter called plane V2;

before the above-mentioned interlocking part 13, in the direction of the groove 9, is formed an open space 44 in the lower lip 11 which is open on the top side;

in the coupled situation, there is a contact zone in the cross section in which the top side of the tongue 8 makes contact with the bottom side of the upper lip 10, whereby the point C3 of this contact zone which is situated most inwardly intersects a first vertical plane, hereafter called plane V3, the most outwardly situated point C4 of this contact zone intersects a second vertical plane, hereafter called plane V4, and both planes V3 and V4 define a vertical plane situated right in between, hereafter called plane V5;

the top side of the interlocking part 13 defines a horizontal level, hereafter called level N1;

the bottom side of the part 16 upon which the tongue 8 is provided and which extends from the tip 24 of the tongue 8 to the interlocking zone, defines a horizontal level, hereafter called level N2;

the levels N1 and N2 define a horizontal level situated right in between, hereafter called level N3;

the average height of the contact zone between the top side of the tongue 8 and the bottom side of the upper lip 10 define a horizontal level, hereafter called level N4;

the distance between the planes V1 and V2 is at least half of the distance between the levels N3 and N4.

This floor covering 1 is special in that it provides at least the combination of the following characteristics:

that the panels 2, and basically also the above-mentioned lips 10-11, are made of fiberboard of the type MDF or HDF;

that the coupling means 43 are made such that the panels 2 can be assembled by pushing them towards one another; and that the above-mentioned space 44 extends to beneath the upper lip 10, such that this space 44 is in conformity with at least one of the following two characteristics:

that the part of this space 44 which is situated under the level N3 extends inwardly to at least past the plane V1;

that the part of this space 44 which is situated under the level N1 extends inwardly to at least past the plane V5.

Thanks to this specific combination there is obtained a space 44 which acts as a depression in relation to the other dimensions extending over a relatively large distance in the direction R2, as a result of which the advantages mentioned in the introduction are obtained. In spite of the relatively large depression and, consequently, the fact that the lower lip 11 is relatively thin, the rigidity remains nevertheless sufficient thanks to the use of MDF or HDF as a base material, which has a layered fibrous structure.

The distance between the levels N1 and N2 is preferably smaller than ⅓ of the distance between the levels N2 and N4. Thus, the obstruction formed by the interlocking part 13 while the panels are being pushed together, is restricted to a minimum, as a result of which the panels 2 can smoothly slide into one another.

Further, the intersection P4 between the plane V4 and the bottom side of the tongue 8 is situated beneath level N1, seen from a cross section, and better still beneath level N3. The tongue 8 thus obtains a relatively large thickness, which improves its rigidity. Further, it is even possible for the section P5 between the plane V5 and the bottom side of the tongue 8 to be situated beneath level N1, and better still beneath level N3.

In particular, the section P3 between the plane V3 and the bottom side of the tongue 8 could be situated beneath level N1, and better still beneath level N3.

According to a preferred characteristic of the invention, the part of the above-mentioned space 44 situated under the plane N3 would extend at least inwardly up to the vertical plane V6 which is determined by the tip 24 of the tongue 8.

In the case where the panels 2 are rectangular and coupling means are formed on both pairs of edges 3-4 and 5-6 which provide for a vertical and a horizontal interlocking, whereby both edges 4 and 6 have a lower lip 11, 11A respectively, which is longer than the upper lip 10, at least the above-mentioned space 44 is preferably made continuous up to the end of the panel 2, as represented in FIG. 18, in the corner 45, in other words it extends through the far end of the square lip 10A, in particular the interlocking part 13A thereof. As the space 44 is relatively large on the one hand, and this space 44 extends through the interlocking part 13A on the other hand, and the interlocking parts 13 and 13A are disconnected from one another, a particularly flexible angle is obtained, which makes it easier to assemble the panels.

FIG. 19 illustrates an eighth aspect of the invention, whereby a depression 46 is provided in the bottom side of the tongue 8, such that in the mutual position of the two panels 2 as represented in FIG. 19, the tongue 8 is better positioned in front of the groove.

It should be noted that in all the above-mentioned embodiments, the contact surfaces providing for the horizontal interlocking are preferably directed slantingly in relation to the plane of the floor covering 1. This does not exclude, however, that according to a variant, one or both contact surfaces can also be directed perpendicular to the plane of the floor covering. The contact surfaces can also be bent as such, whereby the tangent line in the middle of the contact zone determines the above-mentioned gradient.

In the case where these contact surfaces, or their tangent line, are directed slantingly, they preferably extend in a direction which is tangential or almost tangential to a circle, whose center is situated on a point of rotation around which the panels 2 can be turned apart. As indicated in FIG. 3, this means that the gradient or direction B1 of the contact surfaces deviates only little from the gradient of the tangent B2 onto the circle C.

In order to provide for a snap-in effect, the direction B1 pertaining to the contact surfaces preferably does deviate from the direction of the above-mentioned tangent B2 and is directed inwardly, such that a snap-in effect is created when the panels are rotated into one another, whereby the above-mentioned direction B1 deviates 30° at the most from the above-mentioned tangential direction B2.

What precedes can be applied in all the rotatable embodiments described above, also in the embodiments whereby the panels 2 are rotated apart by turning them down.

The coupling means which are realized according to one or several of the first eight aspects of the invention are all particularly suitable to be provided on edges 3-4 and/or 5-6, whereby it must be possible to assemble the panels 2 by shifting them.

In the case where the panels 2 are rectangular, in other words square or longitudinal, they are preferably provided with coupling parts on all four edges 3-4 and 5-6 which allow for a vertical and a horizontal interlocking, whereby coupling means as described in one or several of the above-mentioned first eight aspects are then provided on at least two opposite edges 3-4 or 5-6.

In the case where the panels 2 are rectangular, the new coupling means are preferably provided at least on the short edges 5-6. Further, coupling means are then preferably provided on the long edges 3-4 which allow for an assembly, disassembly respectively by means of a movement of rotation, which can be of a known nature or which can also be made according to any of the above-mentioned eight aspects.

FIGS. 20 to 23 show an embodiment according to a ninth aspect of the invention. According to this ninth aspect, it concerns floor covering hard panels 2, wherein these panels 2 are provided on at least two opposite edges, in the case of elongated panels 2 preferably on the longitudinal edges 3-4, with coupling means 7 made in one piece with the panels 2, so that several of such panels 2 can be mutually connected to one another to form floor covering 1, whereby these coupling means 7 provide for an interlocking in a direction R1, perpendicular to the plane of the coupled panels, as well as in a direction R2 perpendicular to the edges 3-4 concerned and parallel to the plane of the coupled panels, whereby the above-mentioned coupling means 7 are made such that two connected panels 2 can be turned about their coupled edges towards one another toward their bottom side, starting from a flat position, over at least a certain angle on the one hand, whereby this turning movement makes it possible for the two above-mentioned panels 2 to be removed from between other adjacent panels 2D and 2E.

Moreover, according to the embodiment of FIGS. 20 to 23, the coupling means 7 are made such that, as represented in FIG. 22, they make it possible for the two panels 2 to be lifted along their coupled edges 3-4, from a flat position, such that there is a disconnection on at least one of the opposite edges which provide for the connection with the adjacent panels 2D and 2E. Thus, the panels 2 can be removed from an existing floor covering 1 by first lifting them as mentioned above and by subsequently turning the left panel 2 from FIG. 22 up, as represented by means of a dot and dash line, so that the left panel 2 of FIG. 22 can be removed. Next, also the right panel 2 can be removed. The initial lifting of the panels 2 can take place in any way whatsoever, for example by means of a suction cup or by sticking a hook or such through an opening made in the floor covering, for example a bore hole.

FIGS. 20 to 26 represent variants whereby the coupling means 7 are made such that they make it possible for the two panels 2 to be lifted, from a flat position, along their coupled edges 3-4, such that the connection, in particular the vertical connection on the edges 3-4 concerned is undone. In this case, it is not necessary to disconnect the panels 2D and/or 2E first in order to disconnect the two panels 2.

Figure 24:
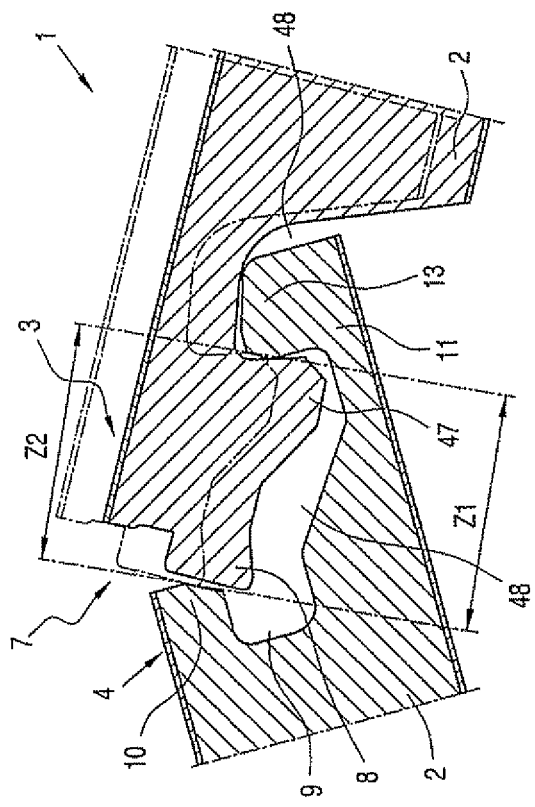
FIG. 24 represents a view analogous to that in FIG. 21 for another variant.
Figure 26:
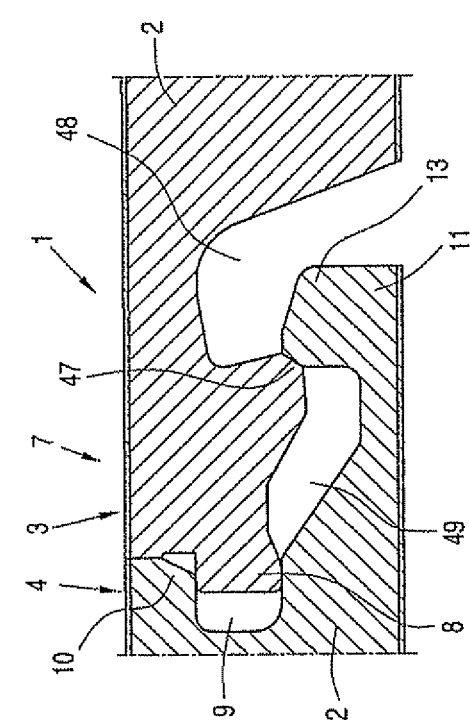
FIG. 26 represents the part indicated by F26 in FIG. 25 on a larger scale.
Figure 25:
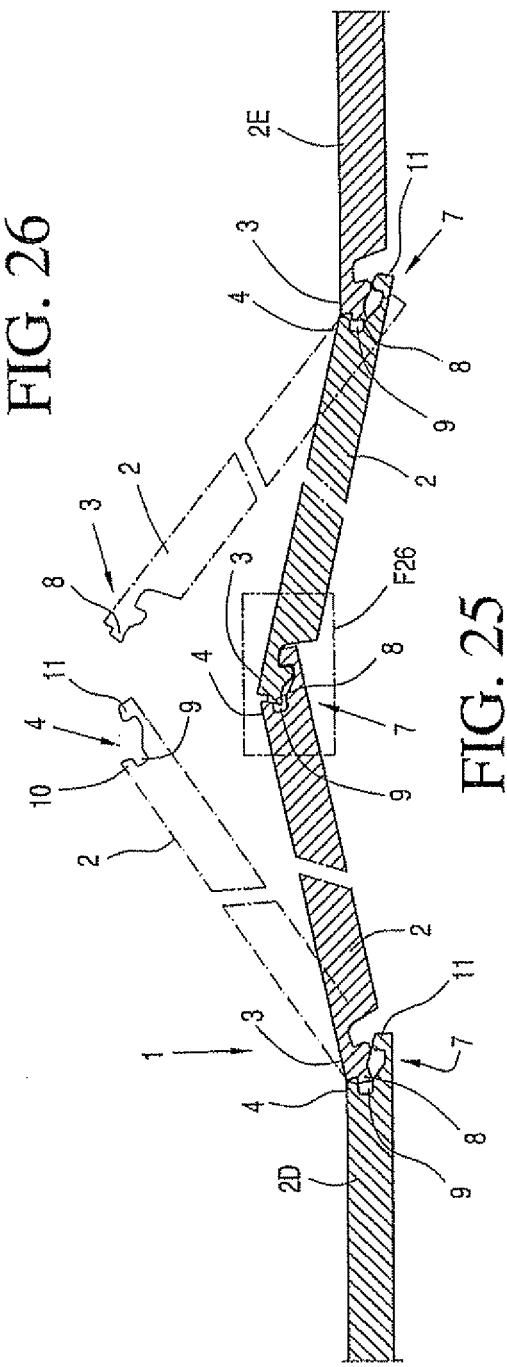
FIG. 25 represents how the panels of FIG. 24 can be mutually disconnected and connected respectively.

Both in the embodiment of FIGS. 20 to 23 and in the one of FIGS. 24 to 26, the coupling means 7 mainly consist of a tongue 8 and a groove 9, whereby the lip 11 which is situated on the bottom side of the groove 9 is longer than the lip 10 on the top side, and the interlocking is mainly obtained in the horizontal direction by means of an interlocking part 13 on the lip 11 and an interlocking part 47 on the bottom side of the other panel 2 working in conjunction with it, whereby these coupling means 7 make it possible for the panels 2 to be assembled by means of a turning movement, and whereby, in the coupled position, there are spaces 48-49 above the first-mentioned interlocking part 13, as well as under the second-mentioned interlocking part 47, which allow for a further turning.

Practically, the above-mentioned interlocking parts 13-47 are positioned such that a lateral play S is created during the above-mentioned further turning, as is schematically represented in FIG. 21, so that a certain freedom of movement is obtained which is desirable in order to remove the panels 2 from between the fixed panels 2D and 2E.

In the embodiment of FIGS. 24 to 26, this lateral play S, as well as the design of the tongue 8 and the groove 9, are selected such that the right panel 2, in the situation of FIG. 26, comes loose so to say and can simply be removed from the left panel 2.

In particular, the distance Z1 between the tip of the tongue 8 and the interlocking part 47 situated on the same edge is smaller than or equal to the distance Z2 between the tip of the lip 10 bordering the top side of the groove 9 and the interlocking part 13 situated on the lip 11 bordering the bottom side of the groove 9.

It should be noted that in the embodiments of FIGS. 20 to 26, the tongue 8 is preferably made such that it can make a movement of rotation in the groove 9, as said tongue 8 is more or less round, as represented in FIGS. 20 to 23, or because it is relatively short, as represented in FIGS. 24 to 26.

As represented, coupling means are preferably provided both on the short edges and on the longitudinal edges which allow for an interlocking both in the vertical and in the horizontal direction, whereby they can all be made such that they allow for a connection and disconnection as described above with regard to FIGS. 20 to 26. It is also possible to apply the coupling means represented in these figures only on the longitudinal edges, whereas coupling means with another shape are applied on the short sides, for example as represented in FIG. 4.

The invention is by no means limited to the above-described embodiments represented in the accompanying drawings; on the contrary, such a floor covering can be made in different shapes and dimensions while still remaining within the scope of the invention.

The invention claimed is:

1. A floor panel for forming a floor covering, wherein the floor panel is a laminate floor panel made of a board made from wood, upon which one or several layers, including a decorative layer, are provided;
    wherein the floor panel is provided, at least at two opposite edges, with coupling parts made in one piece with the floor panel, as a result of which several of such floor panels can be mutually coupled to one another, wherein said coupling parts, in a coupled situation, provide for an interlocking in a direction perpendicular to a plane of the floor covering, as well as in a direction perpendicular to the edges concerned and parallel to the plane of the floor covering, wherein said coupling parts comprise a tongue and a groove, said groove being bordered by an upper lip and a lower lip, the distal end of the upper lip defining a first vertical plane (V1), and said lower lip extending further than the distal end of the upper lip;
    wherein said coupling parts comprise first cooperating surfaces, on the top side of the tongue and the bottom side of the upper lip respectively, said first cooperating surfaces, in the coupled situation, working in conjunction with one another and forming a first cooperating zone, and second cooperating surfaces, on an interlocking part that is situated on the lower lip, past the distal end of the upper lip, and on an opposite part of the other floor panel respectively, said second cooperating surfaces, in the coupled situation, working in conjunction with one another and forming a second cooperating zone;
    wherein the top side of said interlocking part defines a first horizontal level (N1), said first horizontal level (N1) intersecting the edge with the groove at a point situated proximally from said first vertical plane (V1), with respect to the edge of the groove;
    wherein said first cooperating zone is situated above said first horizontal level (N1); and
    wherein the bottom side of the edge with the tongue comprises a substantially flat portion, which is situated below said first horizontal level (N1).

2. The floor panel of claim 1, wherein said substantially flat portion is situated distally from said second cooperating zone, with respect to the edge with the tongue.

3. The floor panel of claim 1, wherein the bottom side of the edge with the tongue comprises an inclined portion which runs upwardly in the direction of the tip of the tongue, wherein, in the coupled situation, said first horizontal level (N1) intersects said inclined portion.

4. The floor panel of claim 3, wherein said inclined portion is connected directly to said substantially flat portion, in distal direction with respect to the edge with the tongue.

5. The floor panel of claim 3, wherein said first horizontal level (N1) intersects said inclined portion at a point being situated proximally from said first vertical plane V1, with respect to the edge with the groove.

6. The floor panel of claim 3, wherein said tongue comprises a distal front surface, which is situated above said first horizontal level (N1).

7. The floor panel of claim 6, wherein said distal front surface is connected directly to said inclined portion and is oriented substantially perpendicular to the plane of the floor covering.

8. The floor panel of claim 1, wherein said first cooperating zone is substantially parallel to the plane of the floor covering.

9. The floor panel of claim 1, wherein the bottom side of the part upon which the tongue is provided and which extends from the tip of the tongue to said second cooperating zone, defines a horizontal level, hereafter called second horizontal level (N2); wherein the first and second horizontal levels (N1, N2) define a third horizontal level (N3) situated therebetween; wherein said third horizontal level (N3) intersects the top side of the lower lip at a point being situated proximally from said first vertical plane (V1), with respect to the edge with the groove.

10. The floor panel of claim 1, wherein said cooperating surfaces forming the second cooperating zone, or a tangent line thereof, are directed slantingly in relation to the plane of the floor covering.

11. The floor panel of claim 1, wherein said coupling parts are made such that the coupling part can be turned in one another by means of a movement of rotation.

12. The floor panel of claim 11, wherein said cooperating surfaces forming the second cooperating zone, or their tangent line, extend in a direction which deviates from the direction of the tangent onto a circle, whose center is situated on a point of rotation around which the floor panels can be turned into one another, such that a snap-in effect is created when the floor panels are rotated into one another, wherein said direction of the cooperating surfaces deviates 30 degrees at the most from the direction of the tangent of said circle.

13. The floor panel of claim 1, wherein said interlocking part is situated near the free end of said lower lip.

14. The floor panel of claim 13, wherein, in the coupled situation, the free end of said lower lip is spaced from the opposite edge of the other floor panel.

15. The floor panel of claim 1, wherein said floor panel is made of fiberboard of either MDF or HDF.

16. The floor panel of claim 15, wherein said decorative layer is selected from the group consisting of: a printed paper layer, a layer of wood, a veneer layer and a cork layer.

17. The floor panel of claim 1, wherein said decorative layer is selected from a group consisting of: a layer of wood, a veneer layer and a cork layer.

18. The floor panel of claim 1, wherein the floor panel is rectangular, said floor panel comprising a first pair of opposite edges, formed by the aforementioned two opposite edges, and a second pair of opposite edges, which is also provided with coupling parts.

19. The floor panel of claim 18, wherein said coupling parts at the second pair of opposite edges offer an interlocking in the horizontal and vertical direction.

\* \* \* \* \*